United States Patent
Herrera et al.

(10) Patent No.: US 12,092,996 B2
(45) Date of Patent: Sep. 17, 2024

(54) LASER-BASED ROTATION SENSOR FOR A CROWN OF AN ELECTRONIC WATCH

(71) Applicant: Apple Inc., Cupertino, CA (US)

(72) Inventors: Antonio F. Herrera, Woodside, CA (US); Erik G. de Jong, San Francisco, CA (US); Jiahui Liang, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 190 days.

(21) Appl. No.: 17/377,482

(22) Filed: Jul. 16, 2021

(65) Prior Publication Data

US 2023/0013283 A1 Jan. 19, 2023

(51) Int. Cl.
*G04G 21/08* (2010.01)
*G01D 5/30* (2006.01)
(Continued)

(52) U.S. Cl.
CPC ............... *G04G 21/08* (2013.01); *G01D 5/30* (2013.01); *G04G 9/007* (2013.01); *G04G 17/08* (2013.01)

(58) Field of Classification Search
CPC ........ G04G 21/08; G04G 9/007; G04G 17/08; G04G 21/00; G01D 5/30; G01D 5/266;
(Continued)

(56) References Cited

U.S. PATENT DOCUMENTS

| 2,237,860 A | 4/1941 | Bolle |
| 2,288,215 A | 6/1942 | Taubert et al. |

(Continued)

FOREIGN PATENT DOCUMENTS

| CH | 1888928 | 1/1937 |
| CH | 706101 | 8/2013 |

(Continued)

OTHER PUBLICATIONS

Narayanaswami et al., "Challenges and considerations for the design and production of a purpose-optimized body-worn wristwatch computer," Defense, Security, and Cockpit Displays, 2004.
(Continued)

*Primary Examiner* — Edwin A. Leon
(74) *Attorney, Agent, or Firm* — Brownstein Hyatt Farber Schreck, LLP

(57) ABSTRACT

An electronic watch includes a housing and a crown assembly including a rotatable actuation member. The rotatable actuation member includes a knob external to the housing and configured to receive a rotational input and a shaft assembly coupled to the knob and positioned at least partially within the housing, the shaft assembly defining a sensing surface configured to rotate in response to the rotational input. The electronic watch further includes an optical sensing system configured to detect the rotational input, the detecting including directing light onto the sensing surface, receiving reflected light from the sensing surface, and producing a signal corresponding to a rotational motion of the sensing surface, the signal based at least in part on an interference between the light directed onto the sensing surface and the reflected light.

20 Claims, 12 Drawing Sheets

(51) Int. Cl.
*G04G 9/00* (2006.01)
*G04G 17/08* (2006.01)

(58) Field of Classification Search
CPC ......... G01P 3/36; G01P 13/045; G04C 3/005; G04C 3/002; G05G 1/08
See application file for complete search history.

(56) References Cited

U.S. PATENT DOCUMENTS

| | | |
|---|---|---|
| 2,497,935 A | 2/1950 | Feurer |
| 2,771,734 A | 11/1956 | Morf |
| 2,788,236 A | 4/1957 | Kafowi |
| 2,797,592 A | 7/1957 | Marrapese |
| 3,040,514 A | 6/1962 | Dinstman |
| 3,056,030 A | 9/1962 | Kelchner |
| 3,130,539 A | 4/1964 | Davis |
| 3,355,873 A | 12/1967 | Morf |
| 3,362,154 A | 1/1968 | Perret |
| 3,410,247 A | 11/1968 | Dronberger |
| 3,495,398 A | 2/1970 | Widmer et al. |
| 3,577,876 A | 5/1971 | Spadini |
| 3,621,649 A | 11/1971 | Vulcan et al. |
| 3,662,618 A | 5/1972 | Kroll et al. |
| 3,733,803 A | 5/1973 | Hiraga |
| 3,937,002 A | 2/1976 | Van Haften |
| 4,007,347 A | 2/1977 | Haber |
| 4,031,341 A | 6/1977 | Wuthrich et al. |
| 4,037,068 A | 7/1977 | Gaynor |
| 4,051,665 A | 10/1977 | Arn |
| 4,077,200 A | 3/1978 | Schneider |
| 4,133,404 A | 1/1979 | Griffin |
| 4,170,104 A | 10/1979 | Yamagata |
| 4,203,280 A | 5/1980 | Ziegler |
| 4,258,096 A | 3/1981 | LaMarche |
| 4,274,152 A | 6/1981 | Ikegami |
| 4,287,400 A | 9/1981 | Kitik |
| 4,289,400 A | 9/1981 | Kubola et al. |
| 4,311,026 A | 1/1982 | Ochoa |
| 4,311,990 A | 1/1982 | Burke |
| 4,324,956 A | 4/1982 | Sakakino et al. |
| 4,345,119 A | 8/1982 | Latasiewicz |
| 4,364,674 A | 12/1982 | Tesch |
| 4,379,642 A | 4/1983 | Meyrat |
| 4,395,134 A | 7/1983 | Luce |
| 4,396,298 A | 8/1983 | Ripley |
| 4,417,824 A | 11/1983 | Paterson et al. |
| 4,448,199 A | 5/1984 | Schmid |
| 4,520,306 A | 5/1985 | Kirby |
| 4,581,509 A | 4/1986 | Sanford et al. |
| 4,600,316 A | 7/1986 | Besson |
| 4,617,461 A | 10/1986 | Subbarao et al. |
| 4,634,861 A | 1/1987 | Ching et al. |
| 4,641,026 A | 2/1987 | Garcia, Jr. |
| 4,670,737 A | 6/1987 | Rilling |
| 4,766,642 A | 8/1988 | Gaffney et al. |
| 4,783,772 A | 11/1988 | Umemoto et al. |
| 4,884,073 A | 11/1989 | Souloumiac |
| 4,914,831 A | 4/1990 | Kanezashi et al. |
| 4,922,070 A | 5/1990 | Dorkinski |
| 4,931,794 A | 6/1990 | Haag |
| 4,952,799 A | 8/1990 | Loewen |
| 4,980,685 A | 12/1990 | Souloumiac et al. |
| 4,987,299 A | 1/1991 | Kobayashi et al. |
| 5,001,687 A | 3/1991 | Brien |
| 5,034,602 A | 7/1991 | Garcia et al. |
| 5,177,355 A | 1/1993 | Branan |
| 5,214,278 A | 5/1993 | Banda |
| 5,258,592 A | 11/1993 | Nishikawa et al. |
| 5,288,993 A | 2/1994 | Bidiville et al. |
| 5,347,123 A | 9/1994 | Jackson et al. |
| 5,383,166 A | 1/1995 | Gallay |
| 5,471,054 A | 11/1995 | Watanabe |
| 5,477,508 A | 12/1995 | Will |
| 5,509,174 A | 4/1996 | Worrell |
| 5,559,761 A | 9/1996 | Frenkel et al. |
| 5,572,314 A | 11/1996 | Hyman et al. |
| 5,583,560 A | 12/1996 | Florin et al. |
| 5,631,881 A | 5/1997 | Pessey et al. |
| 5,726,645 A | 3/1998 | Kamon et al. |
| 5,738,104 A | 4/1998 | Lo |
| 5,748,111 A | 5/1998 | Bates |
| 5,825,353 A | 10/1998 | Will |
| 5,841,050 A | 11/1998 | Clift et al. |
| 5,847,335 A | 12/1998 | Sugahara et al. |
| 5,867,082 A | 2/1999 | Van Zeeland |
| 5,943,233 A | 8/1999 | Ebina |
| 5,953,001 A | 9/1999 | Challener et al. |
| 5,960,366 A | 9/1999 | Duwaer et al. |
| 5,963,332 A | 10/1999 | Feldman et al. |
| 5,999,168 A | 12/1999 | Rosenberg et al. |
| 6,069,567 A | 5/2000 | Zawilski |
| 6,128,006 A | 10/2000 | Rosenberg et al. |
| 6,134,189 A | 10/2000 | Carrard |
| 6,154,201 A | 11/2000 | Levin et al. |
| 6,175,679 B1 | 1/2001 | Veligdan et al. |
| 6,203,190 B1 | 3/2001 | Stotz |
| 6,241,684 B1 | 6/2001 | Amano |
| 6,246,050 B1 | 6/2001 | Tullis et al. |
| 6,252,825 B1 | 6/2001 | Perotto |
| 6,304,247 B1 | 10/2001 | Black |
| 6,355,891 B1 | 3/2002 | Ikunami |
| 6,361,502 B1 | 3/2002 | Puolakanaho et al. |
| 6,377,239 B1 | 4/2002 | Isikawa |
| 6,392,640 B1 | 5/2002 | Will |
| 6,396,006 B1 | 5/2002 | Yokoji et al. |
| 6,422,740 B1 | 7/2002 | Leuenberger |
| 6,477,117 B1 | 11/2002 | Narayanaswami et al. |
| 6,502,982 B1 | 1/2003 | Bach et al. |
| 6,525,278 B2 | 2/2003 | Villain et al. |
| 6,556,222 B1 | 4/2003 | Narayanaswami |
| 6,575,618 B1 | 6/2003 | Inoue et al. |
| 6,587,400 B1 | 7/2003 | Line |
| 6,636,197 B1 | 10/2003 | Goldenberg et al. |
| 6,646,635 B2 | 11/2003 | Pogatetz et al. |
| 6,661,438 B1 | 11/2003 | Shiraishi et al. |
| 6,672,758 B2 | 1/2004 | Ehrsam et al. |
| 6,794,992 B1 | 9/2004 | Rogers |
| 6,809,275 B1 | 10/2004 | Cheng et al. |
| 6,834,430 B2 | 12/2004 | Worrell |
| 6,846,998 B2 | 1/2005 | Hasumi et al. |
| 6,882,596 B2 | 4/2005 | Guanter |
| 6,888,076 B2 | 5/2005 | Hetherington |
| 6,896,403 B1 | 5/2005 | Gau |
| 6,909,378 B1 | 6/2005 | Lambrechts et al. |
| 6,914,551 B2 | 7/2005 | Vidal |
| 6,950,695 B2 | 9/2005 | Chen |
| 6,961,099 B2 | 11/2005 | Takano et al. |
| 6,963,039 B1 | 11/2005 | Weng et al. |
| 6,967,903 B2 | 11/2005 | Guanter |
| 6,977,868 B2 | 12/2005 | Brewer et al. |
| 6,982,930 B1 | 1/2006 | Hung |
| 6,985,107 B2 | 1/2006 | Anson |
| 6,987,568 B2 | 1/2006 | Dana |
| 6,998,553 B2 | 2/2006 | Hisamune et al. |
| 7,009,915 B2 | 3/2006 | Brewer et al. |
| 7,016,263 B2 | 3/2006 | Gueissaz et al. |
| 7,021,442 B2 | 4/2006 | Borgerson |
| 7,031,228 B2 | 4/2006 | Born et al. |
| 7,034,237 B2 | 4/2006 | Ferri et al. |
| 7,081,905 B1 | 7/2006 | Raghunath et al. |
| 7,102,626 B2 | 9/2006 | Denny, III |
| 7,106,307 B2 | 9/2006 | Cok |
| 7,111,365 B1 | 9/2006 | Howie, Jr. |
| 7,113,450 B2 | 9/2006 | Plancon et al. |
| 7,119,289 B2 | 10/2006 | Lacroix |
| 7,135,673 B2 | 11/2006 | Saint Clair |
| 7,167,083 B2 | 1/2007 | Giles |
| 7,187,359 B2 | 3/2007 | Numata |
| 7,244,927 B2 | 7/2007 | Huynh |
| 7,255,473 B2 | 8/2007 | Hiranuma et al. |
| 7,265,336 B2 | 9/2007 | Hataguchi et al. |
| 7,274,303 B2 | 9/2007 | Dresti et al. |
| 7,285,738 B2 | 10/2007 | Lavigne et al. |
| 7,286,063 B2 | 10/2007 | Gauthey |

(56) References Cited

U.S. PATENT DOCUMENTS

| | | |
|---|---|---|
| 7,292,741 B2 | 11/2007 | Ishiyama et al. |
| 7,358,481 B2 | 4/2008 | Yeoh et al. |
| 7,369,308 B2 | 5/2008 | Tsuruta et al. |
| 7,371,745 B2 | 5/2008 | Ebright et al. |
| 7,385,874 B2 | 6/2008 | Vuilleumier |
| 7,404,667 B2 | 7/2008 | Born et al. |
| 7,465,917 B2 | 12/2008 | Chin et al. |
| 7,468,036 B1 | 12/2008 | Rulkov et al. |
| 7,474,592 B2 | 1/2009 | Lyon |
| 7,506,269 B2 | 3/2009 | Lang et al. |
| 7,520,664 B2 | 4/2009 | Wai |
| 7,528,824 B2 | 5/2009 | Kong |
| 7,545,367 B2 | 6/2009 | Sunda et al. |
| 7,557,795 B2 | 7/2009 | Kong et al. |
| 7,591,582 B2 | 9/2009 | Hiranuma et al. |
| 7,593,755 B2 | 9/2009 | Colando et al. |
| 7,605,846 B2 | 10/2009 | Watanabe |
| 7,634,263 B2 | 12/2009 | Louch et al. |
| 7,646,677 B2 | 1/2010 | Nakamura |
| 7,655,874 B2 | 2/2010 | Akieda |
| 7,682,070 B2 | 3/2010 | Burton |
| 7,708,457 B2 | 5/2010 | Girardin |
| 7,710,456 B2 | 5/2010 | Koshiba et al. |
| 7,732,724 B2 | 6/2010 | Otani et al. |
| 7,761,246 B2 | 7/2010 | Matsui |
| 7,763,819 B2 | 7/2010 | Ieda et al. |
| 7,772,507 B2 | 8/2010 | Orr |
| 7,778,115 B2 | 8/2010 | Ruchonnet |
| 7,781,726 B2 | 8/2010 | Matsui et al. |
| RE41,637 E | 9/2010 | O'Hara et al. |
| 7,791,587 B2 | 9/2010 | Kosugi |
| 7,791,588 B2 | 9/2010 | Tierling et al. |
| 7,791,597 B2 | 9/2010 | Silverstein et al. |
| 7,822,469 B2 | 10/2010 | Lo |
| 7,856,255 B2 | 12/2010 | Tsuchiya et al. |
| 7,858,583 B2 | 12/2010 | Schmidt et al. |
| 7,865,324 B2 | 1/2011 | Lindberg |
| 7,894,957 B2 | 2/2011 | Carlson |
| 7,946,758 B2 | 5/2011 | Mooring |
| 8,063,892 B2 | 11/2011 | Shahoian et al. |
| 8,138,488 B2 | 3/2012 | Grot |
| 8,143,981 B2 | 3/2012 | Washizu et al. |
| 8,167,126 B2 | 5/2012 | Stiehl |
| 8,169,402 B2 | 5/2012 | Shahoian et al. |
| 8,188,989 B2 | 5/2012 | Levin et al. |
| 8,195,313 B1 | 6/2012 | Fadell et al. |
| 8,229,535 B2 | 7/2012 | Mensinger et al. |
| 8,248,815 B2 | 8/2012 | Yang et al. |
| 8,263,886 B2 | 9/2012 | Lin et al. |
| 8,263,889 B2 | 9/2012 | Takahashi et al. |
| 8,275,327 B2 | 9/2012 | Yi et al. |
| 8,294,670 B2 | 10/2012 | Griffin et al. |
| 8,312,495 B2 | 11/2012 | Vanderhoff |
| 8,318,340 B2 | 11/2012 | Stimits |
| 8,368,677 B2 | 2/2013 | Yamamoto |
| 8,371,745 B2 | 2/2013 | Manni |
| 8,373,661 B2 | 2/2013 | Lan et al. |
| 8,405,618 B2 | 3/2013 | Colgate |
| 8,410,971 B2 | 4/2013 | Friedlander |
| 8,432,368 B2 | 4/2013 | Momeyer et al. |
| 8,439,559 B2 | 5/2013 | Luk et al. |
| 8,441,450 B2 | 5/2013 | Degner et al. |
| 8,446,713 B2 | 5/2013 | Lai |
| 8,456,430 B2 | 6/2013 | Oliver et al. |
| 8,477,118 B2 | 7/2013 | Lan et al. |
| 8,493,190 B2 | 7/2013 | Periquet et al. |
| 8,508,511 B2 | 8/2013 | Tanaka et al. |
| 8,525,777 B2 | 9/2013 | Stavely et al. |
| 8,562,489 B2 | 10/2013 | Burton et al. |
| 8,568,313 B2 | 10/2013 | Sadhu |
| 8,576,044 B2 | 11/2013 | Chapman |
| 8,593,598 B2 | 11/2013 | Chen et al. |
| 8,607,662 B2 | 12/2013 | Huang |
| 8,614,881 B2 | 12/2013 | Yoo |
| 8,624,836 B1 | 1/2014 | Miller et al. |
| 8,666,682 B2 | 3/2014 | LaVigne et al. |
| 8,677,285 B2 | 3/2014 | Tsern et al. |
| 8,704,787 B2 | 4/2014 | Yamamoto |
| 8,711,093 B2 | 4/2014 | Ong et al. |
| 8,717,151 B2 | 5/2014 | Forutanpour et al. |
| 8,724,087 B2 | 5/2014 | Van De Kerkhof et al. |
| 8,730,167 B2 | 5/2014 | Ming et al. |
| 8,743,088 B2 | 6/2014 | Watanabe |
| 8,783,944 B2 | 7/2014 | Doi |
| 8,797,153 B2 | 8/2014 | Vanhelle et al. |
| 8,804,993 B2 | 8/2014 | Shukla et al. |
| 8,816,962 B2 | 8/2014 | Obermeyer et al. |
| 8,824,245 B2 | 9/2014 | Lau et al. |
| 8,847,741 B2 | 9/2014 | Birnbaum et al. |
| 8,851,372 B2 | 10/2014 | Zhou |
| 8,859,971 B2 | 10/2014 | Weber |
| 8,860,674 B2 | 10/2014 | Lee et al. |
| 8,863,219 B2 | 10/2014 | Brown et al. |
| D717,679 S | 11/2014 | Anderssen |
| 8,878,657 B2 | 11/2014 | Periquet et al. |
| 8,885,856 B2 | 11/2014 | Sacha |
| 8,895,911 B2 | 11/2014 | Takahashi |
| 8,905,631 B2 | 12/2014 | Sakurazawa et al. |
| 8,908,477 B2 | 12/2014 | Peters |
| 8,920,022 B2 | 12/2014 | Ishida et al. |
| 8,922,399 B2 | 12/2014 | Bajaj et al. |
| 8,928,452 B2 | 1/2015 | Kim et al. |
| 8,948,832 B2 | 2/2015 | Hong et al. |
| 8,954,135 B2 | 2/2015 | Yuen et al. |
| 8,975,543 B2 | 3/2015 | Hakemeyer |
| 8,994,827 B2 | 3/2015 | Mistry et al. |
| 9,001,625 B2 | 4/2015 | Essery et al. |
| 9,010,945 B2 | 4/2015 | Vasylyev |
| 9,024,733 B2 | 5/2015 | Wouters |
| 9,028,134 B2 | 5/2015 | Koshoji et al. |
| 9,030,446 B2 | 5/2015 | Mistry et al. |
| 9,034,666 B2 | 5/2015 | Vaganov et al. |
| 9,039,614 B2 | 5/2015 | Yuen et al. |
| 9,041,663 B2 | 5/2015 | Westerman |
| 9,042,971 B2 | 5/2015 | Brumback et al. |
| 9,049,998 B2 | 6/2015 | Brumback et al. |
| 9,052,696 B2 | 6/2015 | Breuillot et al. |
| 9,086,717 B2 | 7/2015 | Meerovitsch |
| 9,086,738 B2 | 7/2015 | Leung et al. |
| 9,091,309 B2 | 7/2015 | Battlogg |
| 9,100,493 B1 | 8/2015 | Zhou |
| 9,101,184 B2 | 8/2015 | Wilson |
| 9,105,413 B2 | 8/2015 | Hiranuma et al. |
| 9,123,483 B2 | 9/2015 | Ferri et al. |
| 9,134,807 B2 | 9/2015 | Shaw et al. |
| 9,141,087 B2 | 9/2015 | Brown et al. |
| 9,176,577 B2 | 11/2015 | Jangaard et al. |
| 9,176,598 B2 | 11/2015 | Sweetser et al. |
| 9,202,372 B2 | 12/2015 | Reams et al. |
| 9,213,409 B2 | 12/2015 | Redelsheimer et al. |
| 9,223,296 B2 | 12/2015 | Yang et al. |
| 9,241,635 B2 | 1/2016 | Yuen et al. |
| 9,244,438 B2 | 1/2016 | Hoover et al. |
| 9,256,209 B2 | 2/2016 | Yang et al. |
| 9,277,156 B2 | 3/2016 | Bennett et al. |
| 9,348,322 B2 | 5/2016 | Fraser et al. |
| 9,350,850 B2 | 5/2016 | Pope et al. |
| 9,367,146 B2 | 6/2016 | Piot |
| 9,386,932 B2 | 7/2016 | Chatterjee et al. |
| 9,426,275 B2 | 8/2016 | Eim et al. |
| 9,430,042 B2 | 8/2016 | Levin |
| 9,437,357 B2 | 9/2016 | Furuki et al. |
| 9,449,770 B2 | 9/2016 | Sanford et al. |
| 9,453,939 B2 | 9/2016 | Tortora et al. |
| 9,501,044 B2 | 11/2016 | Jackson et al. |
| 9,520,100 B2 | 12/2016 | Houjou et al. |
| 9,532,723 B2 | 1/2017 | Kim |
| 9,542,016 B2 | 1/2017 | Armstrong-Muntner |
| 9,545,541 B2 | 1/2017 | Aragones et al. |
| 9,547,280 B2 | 1/2017 | Born et al. |
| 9,552,023 B2 | 1/2017 | Joo et al. |
| 9,599,964 B2 | 3/2017 | Gracia |
| 9,600,071 B2 | 3/2017 | Rothkopf |
| 9,606,721 B2 | 3/2017 | Park et al. |

(56) References Cited

U.S. PATENT DOCUMENTS

| | | |
|---|---|---|
| 9,607,505 B2 | 3/2017 | Rothkopf et al. |
| 9,620,312 B2 | 4/2017 | Ely et al. |
| 9,627,163 B2 | 4/2017 | Ely et al. |
| 9,632,318 B2 | 4/2017 | Goto et al. |
| 9,632,537 B2 | 4/2017 | Memering |
| 9,638,587 B2 | 5/2017 | Marquas et al. |
| 9,651,922 B2 | 5/2017 | Hysek et al. |
| 9,659,482 B2 | 5/2017 | Yang et al. |
| 9,680,831 B2 | 6/2017 | Jooste et al. |
| 9,709,956 B1 | 7/2017 | Ely et al. |
| 9,753,436 B2 | 9/2017 | Ely et al. |
| D800,172 S | 10/2017 | Akana |
| 9,800,717 B2 | 10/2017 | Ma et al. |
| 9,836,025 B2 | 12/2017 | Ely et al. |
| 9,851,613 B2 | 12/2017 | Noble et al. |
| 9,873,711 B2 | 1/2018 | Hoover et al. |
| 9,874,945 B2 | 1/2018 | Fukumoto |
| 9,886,006 B2 | 2/2018 | Ely et al. |
| 9,891,590 B2 | 2/2018 | Shim et al. |
| 9,891,651 B2 | 2/2018 | Jackson et al. |
| 9,891,667 B2 | 2/2018 | Jung et al. |
| 9,898,032 B2 | 2/2018 | Hafez et al. |
| 9,913,591 B2 | 3/2018 | Lapetina et al. |
| 9,921,548 B2 | 3/2018 | Mitani |
| 9,927,902 B2 | 3/2018 | Burr et al. |
| 9,939,923 B2 | 4/2018 | Sharma |
| 9,946,297 B2 | 4/2018 | Nazzaro et al. |
| 9,952,558 B2 | 4/2018 | Ely |
| 9,952,682 B2 | 4/2018 | Zhang et al. |
| 9,971,305 B2 | 5/2018 | Ely et al. |
| 9,971,405 B2 | 5/2018 | Salo et al. |
| 9,971,407 B2 | 5/2018 | Holenarsipur et al. |
| 9,979,426 B2 | 5/2018 | Na et al. |
| 10,001,817 B2 | 6/2018 | Zambetti et al. |
| 10,012,550 B2 | 7/2018 | Yang |
| 10,018,966 B2 | 7/2018 | Ely et al. |
| 10,019,097 B2 | 7/2018 | Ely et al. |
| 10,037,006 B2 | 7/2018 | Ely |
| 10,037,081 B2 | 7/2018 | Grant |
| 10,048,802 B2 | 8/2018 | Shedletsky |
| 10,057,470 B2 | 8/2018 | Kim et al. |
| 10,061,399 B2 | 8/2018 | Bushnell et al. |
| 10,066,970 B2 | 9/2018 | Gowreesunker et al. |
| 10,092,203 B2 | 10/2018 | Mirov |
| 10,108,016 B2 | 10/2018 | Bosveld |
| 10,114,342 B2 | 10/2018 | Kim et al. |
| 10,145,711 B2 | 12/2018 | Boonsom et al. |
| 10,175,652 B2 | 1/2019 | Ely et al. |
| 10,190,891 B1 | 1/2019 | Rothkopf et al. |
| 10,191,455 B2 | 1/2019 | Shim et al. |
| 10,203,662 B1 | 2/2019 | Lin et al. |
| 10,209,148 B2 | 2/2019 | Lyon et al. |
| 10,216,147 B2 | 2/2019 | Ely et al. |
| 10,222,755 B2 | 3/2019 | Coakley et al. |
| 10,222,756 B2 | 3/2019 | Ely et al. |
| 10,222,909 B2 | 3/2019 | Shedletsky et al. |
| 10,234,828 B2 | 3/2019 | Ely et al. |
| 10,241,593 B2 | 3/2019 | Chen |
| 10,296,125 B2 | 5/2019 | Ely et al. |
| 10,331,081 B2 | 6/2019 | Ely et al. |
| 10,331,082 B2 | 6/2019 | Ely et al. |
| 10,332,111 B2 | 6/2019 | Mokhasi et al. |
| 10,353,487 B2 | 7/2019 | Chung et al. |
| 10,379,629 B2 | 8/2019 | Bushnell et al. |
| 10,386,940 B2 | 8/2019 | Kim |
| 10,401,961 B2 | 9/2019 | Cruz-Hernandez et al. |
| 10,429,959 B2 | 10/2019 | Battlogg |
| 10,444,040 B2 | 10/2019 | Ruh |
| 10,474,194 B1 | 11/2019 | Ell et al. |
| 10,503,258 B2 | 12/2019 | Holenarsipur et al. |
| 10,509,486 B2 | 12/2019 | Bushnell et al. |
| 10,524,671 B2 | 1/2020 | Lamego |
| 10,534,320 B2 | 1/2020 | Ferri |
| 10,551,798 B1 | 2/2020 | Bushnell et al. |
| 10,572,053 B2 | 2/2020 | Ely et al. |
| 10,593,617 B2 | 3/2020 | Ashikaga et al. |
| 10,599,101 B2 | 3/2020 | Rothkopf et al. |
| 10,610,157 B2 | 4/2020 | Pandya et al. |
| 10,613,685 B2 | 4/2020 | Shedletsky |
| 10,627,783 B2 | 4/2020 | Rothkopf et al. |
| 10,655,988 B2 | 5/2020 | Boonsom et al. |
| 10,664,074 B2 | 5/2020 | Moussette et al. |
| 10,732,571 B2 | 8/2020 | Ely et al. |
| 10,765,019 B2 | 9/2020 | Werner et al. |
| 10,840,041 B1 | 11/2020 | Harms |
| 10,845,764 B2 | 11/2020 | Ely et al. |
| 10,852,700 B2 | 12/2020 | Abramov |
| 10,852,855 B2 | 12/2020 | Niu |
| 10,871,385 B2 | 12/2020 | Kok |
| 10,884,549 B2 | 1/2021 | Shedletsky et al. |
| 10,936,071 B2 | 3/2021 | Pandya et al. |
| 10,942,491 B2 | 3/2021 | Rothkopf |
| 10,948,880 B2 | 3/2021 | Ely et al. |
| 10,955,937 B2 | 3/2021 | Bushnell et al. |
| 10,962,930 B2 | 3/2021 | Ely et al. |
| 10,962,935 B1 | 3/2021 | Ely et al. |
| 10,987,054 B2 | 4/2021 | Pandya et al. |
| 11,000,193 B2 | 5/2021 | Tal et al. |
| 11,002,572 B2 | 5/2021 | Boonsom et al. |
| 11,029,831 B2 | 6/2021 | Block et al. |
| 11,036,318 B2 | 6/2021 | Kuboyama |
| 11,148,292 B2 | 10/2021 | Bryner et al. |
| 11,181,863 B2 | 11/2021 | Ely et al. |
| 11,194,298 B2 | 12/2021 | Roach et al. |
| 11,221,590 B2 | 1/2022 | Rothkopf et al. |
| 11,347,189 B1 | 5/2022 | Herrera et al. |
| 11,350,869 B2 | 6/2022 | Rasmussen et al. |
| 11,360,440 B2 | 6/2022 | Perkins et al. |
| 11,385,599 B2 | 7/2022 | Ely et al. |
| 11,429,256 B2 | 8/2022 | Ham |
| 11,432,766 B2 | 9/2022 | Pandya et al. |
| 11,474,483 B2 | 10/2022 | Rothkopf |
| 11,531,306 B2 | 12/2022 | Ely et al. |
| 11,556,095 B2 | 1/2023 | Hiemstra et al. |
| 11,567,457 B2 | 1/2023 | Rothkopf et al. |
| 11,644,800 B2 | 5/2023 | Holenarsipur et al. |
| 11,669,205 B2 | 6/2023 | Shedletsky et al. |
| 11,674,825 B2 | 6/2023 | Li et al. |
| 11,720,064 B2 | 8/2023 | Ely |
| 11,747,662 B2 | 9/2023 | Xue |
| 11,754,981 B2 | 9/2023 | Perkins |
| 11,796,961 B2 | 10/2023 | Ely et al. |
| 11,815,860 B2 | 11/2023 | Pandya et al. |
| 11,860,587 B2 | 1/2024 | Taylor et al. |
| 2002/0101457 A1 | 8/2002 | Lang |
| 2003/0174590 A1 | 9/2003 | Arikawa et al. |
| 2004/0047244 A1 | 3/2004 | Iino et al. |
| 2004/0082414 A1 | 4/2004 | Knox |
| 2004/0130971 A1 | 7/2004 | Ecoffet et al. |
| 2004/0264301 A1 | 12/2004 | Howard et al. |
| 2005/0075558 A1 | 4/2005 | Vecerina et al. |
| 2005/0088417 A1 | 4/2005 | Mulligan |
| 2006/0250377 A1 | 11/2006 | Zadesky et al. |
| 2007/0013775 A1 | 1/2007 | Shin |
| 2007/0050054 A1 | 3/2007 | Sambandam Guruparan et al. |
| 2007/0182708 A1 | 8/2007 | Poupyrev et al. |
| 2007/0211042 A1 | 9/2007 | Kim et al. |
| 2007/0222756 A1 | 9/2007 | Wu et al. |
| 2007/0229671 A1 | 10/2007 | Takeshita et al. |
| 2007/0242569 A1 | 10/2007 | Inoue |
| 2007/0247421 A1 | 10/2007 | Orsley et al. |
| 2008/0130914 A1 | 6/2008 | Cho |
| 2008/0181059 A1 | 7/2008 | Wai |
| 2008/0185272 A1 | 8/2008 | Otani et al. |
| 2009/0025872 A1 | 1/2009 | Nilsen et al. |
| 2009/0051649 A1 | 2/2009 | Rondel |
| 2009/0073119 A1 | 3/2009 | Le et al. |
| 2009/0115748 A1 | 5/2009 | Tanaka et al. |
| 2009/0122656 A1 | 5/2009 | Bonnet et al. |
| 2009/0146975 A1 | 6/2009 | Chang |
| 2009/0152452 A1 | 6/2009 | Lee et al. |
| 2009/0217207 A1 | 8/2009 | Kagermeier et al. |
| 2009/0285443 A1 | 11/2009 | Camp et al. |
| 2009/0312051 A1 | 12/2009 | Hansson et al. |

(56) References Cited

U.S. PATENT DOCUMENTS

| | | |
|---|---|---|
| 2010/0033430 A1 | 2/2010 | Kakutani et al. |
| 2010/0053468 A1 | 3/2010 | Harvill |
| 2010/0079225 A1 | 4/2010 | Washizu et al. |
| 2010/0081375 A1 | 4/2010 | Rosenblatt et al. |
| 2010/0149099 A1 | 6/2010 | Elias |
| 2011/0007468 A1 | 1/2011 | Burton et al. |
| 2011/0090148 A1 | 4/2011 | Li et al. |
| 2011/0158057 A1 | 6/2011 | Brewer et al. |
| 2011/0242064 A1 | 10/2011 | Ono et al. |
| 2011/0249378 A1 | 10/2011 | Yoo |
| 2011/0270358 A1 | 11/2011 | Davis et al. |
| 2012/0067711 A1 | 3/2012 | Yang |
| 2012/0068857 A1 | 3/2012 | Rothkopf et al. |
| 2012/0075082 A1 | 3/2012 | Rothkopf et al. |
| 2012/0112859 A1 | 5/2012 | Park et al. |
| 2012/0113044 A1 | 5/2012 | Strazisar et al. |
| 2012/0206248 A1 | 8/2012 | Biggs |
| 2012/0272784 A1 | 11/2012 | Bailey et al. |
| 2013/0037396 A1 | 2/2013 | Yu |
| 2013/0087443 A1 | 4/2013 | Kikuchi |
| 2013/0191220 A1 | 7/2013 | Dent et al. |
| 2013/0235704 A1 | 9/2013 | Grinberg |
| 2013/0261405 A1 | 10/2013 | Lee et al. |
| 2013/0335196 A1 | 12/2013 | Zhang et al. |
| 2014/0009397 A1 | 1/2014 | Gillespie et al. |
| 2014/0045547 A1 | 2/2014 | Singamsetty et al. |
| 2014/0071098 A1 | 3/2014 | You et al. |
| 2014/0073486 A1 | 3/2014 | Ahmed et al. |
| 2014/0132516 A1 | 5/2014 | Tsai et al. |
| 2014/0143784 A1 | 5/2014 | Mistry |
| 2014/0197936 A1 | 7/2014 | Biggs et al. |
| 2014/0340318 A1 | 11/2014 | Stringer et al. |
| 2014/0347289 A1 | 11/2014 | Suh et al. |
| 2014/0368442 A1 | 12/2014 | Vahtola |
| 2014/0375579 A1 | 12/2014 | Fujiwara |
| 2015/0026647 A1 | 1/2015 | Park et al. |
| 2015/0041289 A1 | 2/2015 | Ely et al. |
| 2015/0049059 A1 | 2/2015 | Zadesky et al. |
| 2015/0098309 A1 | 4/2015 | Adams et al. |
| 2015/0124415 A1 | 5/2015 | Goyal et al. |
| 2015/0186609 A1 | 7/2015 | Utter, II |
| 2015/0221460 A1 | 8/2015 | Teplitxky et al. |
| 2015/0293592 A1 | 10/2015 | Cheong |
| 2015/0320346 A1 | 11/2015 | Chen |
| 2015/0338642 A1 | 11/2015 | Sanford |
| 2015/0341031 A1 | 11/2015 | Marquas et al. |
| 2015/0366098 A1 | 12/2015 | Lapetina et al. |
| 2016/0018846 A1 | 1/2016 | Zenoff |
| 2016/0054813 A1 | 2/2016 | Schediwy et al. |
| 2016/0058375 A1 | 3/2016 | Rothkopf et al. |
| 2016/0061636 A1 | 3/2016 | Gowreesunker et al. |
| 2016/0062623 A1 | 3/2016 | Howard et al. |
| 2016/0069713 A1 | 3/2016 | Ruh et al. |
| 2016/0109861 A1 | 4/2016 | Kim et al. |
| 2016/0116306 A1 | 4/2016 | Ferri et al. |
| 2016/0147432 A1 | 5/2016 | Shi et al. |
| 2016/0170598 A1 | 6/2016 | Zambetti et al. |
| 2016/0170608 A1 | 6/2016 | Zambetti et al. |
| 2016/0170624 A1 | 6/2016 | Zambetti et al. |
| 2016/0241688 A1 | 8/2016 | Vossoughi |
| 2016/0253487 A1 | 9/2016 | Sarkar et al. |
| 2016/0306446 A1 | 10/2016 | Chung et al. |
| 2016/0320583 A1 | 11/2016 | Hall, Jr. |
| 2016/0327911 A1 | 11/2016 | Eim et al. |
| 2016/0338642 A1 | 11/2016 | Parara et al. |
| 2016/0378069 A1 | 12/2016 | Rothkopf et al. |
| 2016/0378070 A1 | 12/2016 | Rothkopf et al. |
| 2016/0378071 A1 | 12/2016 | Rothkopf et al. |
| 2017/0011210 A1 | 1/2017 | Cheong et al. |
| 2017/0027461 A1 | 2/2017 | Shin et al. |
| 2017/0031449 A1 | 2/2017 | Karsten et al. |
| 2017/0045958 A1 | 2/2017 | Battlogg et al. |
| 2017/0061863 A1 | 3/2017 | Eguchi |
| 2017/0069443 A1 | 3/2017 | Wang et al. |
| 2017/0069444 A1 | 3/2017 | Wang et al. |
| 2017/0069447 A1 | 3/2017 | Wang et al. |
| 2017/0089735 A1 | 3/2017 | Ruh |
| 2017/0090572 A1 | 3/2017 | Holenarsipur |
| 2017/0090599 A1 | 3/2017 | Kuboyama |
| 2017/0104902 A1 | 4/2017 | Kim et al. |
| 2017/0139489 A1 | 5/2017 | Chen et al. |
| 2017/0216519 A1 | 8/2017 | Vouillamoz |
| 2017/0216668 A1 | 8/2017 | Burton et al. |
| 2017/0238138 A1 | 8/2017 | Aminzade |
| 2017/0251561 A1 | 8/2017 | Fleck et al. |
| 2017/0269715 A1 | 9/2017 | Kim et al. |
| 2017/0285404 A1 | 10/2017 | Kubota et al. |
| 2017/0301314 A1 | 10/2017 | Kim et al. |
| 2017/0307414 A1 | 10/2017 | Ferri et al. |
| 2017/0319082 A1 | 11/2017 | Sayme |
| 2017/0331869 A1 | 11/2017 | Bendahan et al. |
| 2017/0357465 A1 | 12/2017 | Dzeryn et al. |
| 2018/0018026 A1 | 1/2018 | Bushnell et al. |
| 2018/0059624 A1 | 3/2018 | James |
| 2018/0136686 A1 | 5/2018 | Jackson et al. |
| 2018/0196517 A1 | 7/2018 | Tan et al. |
| 2018/0225701 A1 | 8/2018 | Han |
| 2018/0235491 A1 | 8/2018 | Bayley et al. |
| 2018/0239306 A1 | 8/2018 | Ely |
| 2018/0337551 A1 | 11/2018 | Park |
| 2018/0364815 A1* | 12/2018 | Moussette .............. G04G 21/00 |
| 2019/0025940 A1 | 1/2019 | Shim et al. |
| 2019/0056700 A1 | 2/2019 | Matsuno |
| 2019/0072911 A1 | 3/2019 | Ely et al. |
| 2019/0072912 A1 | 3/2019 | Pandya et al. |
| 2019/0082547 A1 | 3/2019 | Werner et al. |
| 2019/0088583 A1 | 3/2019 | Ashikaga et al. |
| 2019/0163324 A1 | 5/2019 | Shedletsky |
| 2019/0250754 A1 | 8/2019 | Ely et al. |
| 2019/0278232 A1* | 9/2019 | Ely ....................... G04C 3/004 |
| 2019/0317454 A1 | 10/2019 | Holenarsipur et al. |
| 2019/0391539 A1* | 12/2019 | Perkins ................ G01D 5/3473 |
| 2020/0041962 A1 | 2/2020 | Beyhs |
| 2020/0064774 A1 | 2/2020 | Ely et al. |
| 2020/0064779 A1 | 2/2020 | Pandya et al. |
| 2020/0073339 A1 | 3/2020 | Roach et al. |
| 2020/0085331 A1 | 3/2020 | Chou |
| 2020/0110473 A1 | 4/2020 | Bushnell et al. |
| 2020/0150815 A1 | 5/2020 | Ely et al. |
| 2020/0159172 A1 | 5/2020 | Bushnell et al. |
| 2020/0233380 A1 | 7/2020 | Rothkopf |
| 2020/0233529 A1 | 7/2020 | Shedletsky et al. |
| 2020/0310609 A1 | 10/2020 | Ham |
| 2021/0055696 A1 | 2/2021 | Ely |
| 2021/0060783 A1 | 3/2021 | Bryner et al. |
| 2021/0089136 A1 | 3/2021 | Hossain et al. |
| 2021/0096688 A1 | 4/2021 | Shedletsky et al. |
| 2021/0157278 A1 | 5/2021 | Xue |
| 2021/0181682 A1 | 6/2021 | Ely et al. |
| 2021/0181688 A1 | 6/2021 | Ely et al. |
| 2021/0181690 A1 | 6/2021 | Rothkopf et al. |
| 2021/0181691 A1 | 6/2021 | Rothkopf et al. |
| 2021/0181692 A1 | 6/2021 | Rothkopf et al. |
| 2021/0181865 A1 | 6/2021 | Bushnell et al. |
| 2021/0199475 A1 | 7/2021 | Dantler et al. |
| 2021/0353226 A1 | 11/2021 | Hiemstra |
| 2021/0405594 A1 | 12/2021 | Holenarsipur et al. |
| 2022/0043397 A1 | 2/2022 | Ely |
| 2022/0043402 A1 | 2/2022 | Roach |
| 2022/0075328 A1 | 3/2022 | Taylor |
| 2022/0261111 A1 | 8/2022 | Shedletsky et al. |
| 2022/0299944 A1 | 9/2022 | Ely |
| 2022/0326660 A1 | 10/2022 | Perkins |
| 2022/0413446 A1 | 12/2022 | Rothkopf et al. |
| 2023/0012897 A1 | 1/2023 | Bushnell et al. |
| 2023/0013283 A1 | 1/2023 | Herrera et al. |
| 2023/0028554 A1 | 1/2023 | Rothkopf et al. |
| 2023/0077241 A1 | 3/2023 | Pandya et al. |
| 2023/0097827 A1 | 3/2023 | Rothkopf et al. |
| 2023/0101015 A1 | 3/2023 | Ely et al. |
| 2023/0161299 A1 | 5/2023 | Beyhs |
| 2023/0168635 A1 | 6/2023 | Hiemstra et al. |
| 2023/0213893 A1 | 7/2023 | Rothkopf et al. |
| 2023/0341819 A1 | 7/2023 | Ely et al. |

(56) References Cited

U.S. PATENT DOCUMENTS

| | | |
|---|---|---|
| 2023/0258479 A1 | 8/2023 | Li et al. |
| 2023/0259235 A1 | 8/2023 | Shedletsky et al. |
| 2023/0273572 A1 | 8/2023 | Holenarsipur et al. |
| 2023/0393536 A1 | 12/2023 | Perkins et al. |
| 2023/0400818 A1 | 12/2023 | Davis et al. |
| 2023/0418230 A1 | 12/2023 | Ely et al. |
| 2024/0036523 A1 | 2/2024 | Pandya et al. |
| 2024/0045383 A1 | 2/2024 | Roach et al. |
| 2024/0053707 A1 | 2/2024 | Ely et al. |
| 2024/0126219 A1 | 4/2024 | Taylor et al. |
| 2024/0152100 A1 | 5/2024 | Beyhs |

FOREIGN PATENT DOCUMENTS

| | | |
|---|---|---|
| CN | 1302740 | 9/2001 |
| CN | 1445627 | 10/2003 |
| CN | 1504843 | 6/2004 |
| CN | 1601408 | 3/2005 |
| CN | 1624427 | 6/2005 |
| CN | 1792295 | 6/2006 |
| CN | 1825224 | 8/2006 |
| CN | 101035148 | 9/2007 |
| CN | 101201587 | 6/2008 |
| CN | 201081979 | 7/2008 |
| CN | 101404928 | 4/2009 |
| CN | 201262741 | 6/2009 |
| CN | 101641663 | 2/2010 |
| CN | 101750958 | 6/2010 |
| CN | 201638168 | 11/2010 |
| CN | 101923314 | 12/2010 |
| CN | 102067070 | 5/2011 |
| CN | 102216959 | 10/2011 |
| CN | 202008579 | 10/2011 |
| CN | 102590925 | 7/2012 |
| CN | 102741772 | 10/2012 |
| CN | 102890443 | 1/2013 |
| CN | 202710937 | 1/2013 |
| CN | 103177891 | 6/2013 |
| CN | 103191557 | 7/2013 |
| CN | 103253067 | 8/2013 |
| CN | 103645804 | 3/2014 |
| CN | 203564224 | 4/2014 |
| CN | 103852090 | 6/2014 |
| CN | 203630524 | 6/2014 |
| CN | 103919536 | 7/2014 |
| CN | 103956006 | 7/2014 |
| CN | 203693601 | 7/2014 |
| CN | 203705837 | 7/2014 |
| CN | 203732900 | 7/2014 |
| CN | 103995456 | 8/2014 |
| CN | 104020660 | 9/2014 |
| CN | 203941395 | 11/2014 |
| CN | 104777987 | 4/2015 |
| CN | 104685794 | 6/2015 |
| CN | 204479929 | 7/2015 |
| CN | 204496177 | 7/2015 |
| CN | 104880937 | 9/2015 |
| CN | 104898406 | 9/2015 |
| CN | 204650147 | 9/2015 |
| CN | 105022947 | 11/2015 |
| CN | 105096979 | 11/2015 |
| CN | 105339871 | 2/2016 |
| CN | 105446125 | 3/2016 |
| CN | 205121417 | 3/2016 |
| CN | 105547146 | 5/2016 |
| CN | 105556433 | 5/2016 |
| CN | 105683876 | 6/2016 |
| CN | 105683877 | 6/2016 |
| CN | 105760067 | 7/2016 |
| CN | 105955519 | 9/2016 |
| CN | 205645648 | 10/2016 |
| CN | 205721636 | 11/2016 |
| CN | 205750744 | 11/2016 |
| CN | 106236051 | 12/2016 |
| CN | 106557218 | 4/2017 |
| CN | 206147524 | 5/2017 |
| CN | 206209589 | 5/2017 |
| CN | 107111342 | 8/2017 |
| CN | 107122088 | 9/2017 |
| CN | 107966895 | 4/2018 |
| CN | 209560397 | 10/2019 |
| CN | 209625187 | 11/2019 |
| CN | 114220694 | 3/2022 |
| CN | 106125968 | 11/2022 |
| DE | 2352016 | 4/1975 |
| DE | 3706194 | 9/1988 |
| DE | 102008023651 | 11/2009 |
| DE | 102016215087 | 3/2017 |
| EP | 0165548 | 12/1985 |
| EP | 0556155 | 8/1993 |
| EP | 1345095 | 9/2003 |
| EP | 1519452 | 3/2005 |
| EP | 1669724 | 6/2006 |
| EP | 1832969 | 9/2007 |
| EP | 2375295 | 10/2011 |
| EP | 2579186 | 4/2013 |
| EP | 2720129 | 4/2014 |
| EP | 2884239 | 6/2015 |
| FR | 2030093 | 10/1970 |
| FR | 2801402 | 5/2001 |
| GB | 887369 | 1/1962 |
| GB | 2433211 | 6/2007 |
| JP | S52151058 | 12/1977 |
| JP | S52164551 | 12/1977 |
| JP | S53093067 | 8/1978 |
| JP | S5478178 | 6/1979 |
| JP | S54087779 | 6/1979 |
| JP | S5708582 | 1/1982 |
| JP | S5734457 | 2/1982 |
| JP | S30103936 | 6/1985 |
| JP | S60103937 | 6/1985 |
| JP | H02285214 | 11/1990 |
| JP | H04093719 | 3/1992 |
| JP | H04157319 | 5/1992 |
| JP | H05203465 | 8/1993 |
| JP | H05312595 | 11/1993 |
| JP | H06331761 | 12/1994 |
| JP | H06347293 | 12/1994 |
| JP | H07116141 | 5/1995 |
| JP | hH0914941 | 1/1997 |
| JP | H10161811 | 6/1998 |
| JP | H11121210 | 4/1999 |
| JP | H11191508 | 7/1999 |
| JP | 2000258559 | 9/2000 |
| JP | 2000316824 | 11/2000 |
| JP | 2000337892 | 12/2000 |
| JP | 2001084934 | 3/2001 |
| JP | 2001167651 | 6/2001 |
| JP | 2001202178 | 7/2001 |
| JP | 2001215288 | 8/2001 |
| JP | 2001289977 | 10/2001 |
| JP | 2001524206 | 11/2001 |
| JP | 2002071480 | 3/2002 |
| JP | 2002165768 | 6/2002 |
| JP | 2003036144 | 2/2003 |
| JP | 2003050668 | 2/2003 |
| JP | 2003151410 | 5/2003 |
| JP | 2003215271 | 7/2003 |
| JP | 2003331693 | 11/2003 |
| JP | 2004079410 | 3/2004 |
| JP | 2004184396 | 7/2004 |
| JP | 2004028979 | 11/2004 |
| JP | 2005017011 | 1/2005 |
| JP | 2005063200 | 3/2005 |
| JP | 2005099023 | 4/2005 |
| JP | 2005108630 | 4/2005 |
| JP | 2006101505 | 4/2006 |
| JP | 2006164275 | 6/2006 |
| JP | 3852854 | 12/2006 |
| JP | 2007101380 | 4/2007 |
| JP | 2007149620 | 6/2007 |
| JP | 2007248176 | 9/2007 |
| JP | 2007285748 | 11/2007 |
| JP | 2007311153 | 11/2007 |

(56) References Cited

FOREIGN PATENT DOCUMENTS

| | | |
|---|---|---|
| JP | 2008053980 | 3/2008 |
| JP | 2008122124 | 5/2008 |
| JP | 2008122377 | 5/2008 |
| JP | 2008170436 | 7/2008 |
| JP | 2008235226 | 10/2008 |
| JP | 2009009382 | 1/2009 |
| JP | 2009070657 | 4/2009 |
| JP | 2009519737 | 5/2009 |
| JP | 2009540399 | 11/2009 |
| JP | 2010032545 | 2/2010 |
| JP | 2010515153 | 5/2010 |
| JP | 2010165001 | 7/2010 |
| JP | 2010186572 | 8/2010 |
| JP | 2010243344 | 10/2010 |
| JP | 2010244797 | 10/2010 |
| JP | 2011021929 | 2/2011 |
| JP | 2011165468 | 8/2011 |
| JP | 2011221659 | 11/2011 |
| JP | 2012053801 | 3/2012 |
| JP | 2012221905 | 11/2012 |
| JP | 2013057516 | 3/2013 |
| JP | 2013079961 | 5/2013 |
| JP | 2013524189 | 6/2013 |
| JP | 3190075 | 4/2014 |
| JP | 5477393 | 4/2014 |
| JP | 2014512556 | 5/2014 |
| JP | 201411222 | 6/2014 |
| JP | 2014174031 | 9/2014 |
| JP | 2017219448 | 12/2017 |
| JP | 2018510451 | 4/2018 |
| KR | 20010030477 | 4/2001 |
| KR | 200278568 | 3/2002 |
| KR | 20070011685 | 1/2007 |
| KR | 20070014247 | 2/2007 |
| KR | 100754674 | 9/2007 |
| KR | 20080028935 | 4/2008 |
| KR | 20080045397 | 5/2008 |
| KR | 100849684 | 8/2008 |
| KR | 1020080111563 | 12/2008 |
| KR | 2020100007563 | 7/2010 |
| KR | 20110011393 | 2/2011 |
| KR | 20110012784 | 2/2011 |
| KR | 20110103761 | 9/2011 |
| KR | 20110113368 | 10/2011 |
| KR | 20130036038 | 4/2013 |
| KR | 20130131873 | 12/2013 |
| KR | 20140051391 | 4/2014 |
| KR | 20140064689 | 5/2014 |
| KR | 20140104388 | 8/2014 |
| KR | 20160017070 | 2/2016 |
| KR | 20160048967 | 5/2016 |
| KR | 20170106395 | 9/2017 |
| KR | 10-2020-0027010 | 3/2020 |
| KR | 102136836 | 7/2020 |
| NL | 1040225 | 11/2014 |
| RO | 129033 | 11/2013 |
| TW | 200633681 | 10/2006 |
| WO | WO2001/022038 | 3/2001 |
| WO | WO2001/069567 | 9/2001 |
| WO | WO2003/032538 | 4/2003 |
| WO | WO 10/001299 | 1/2010 |
| WO | WO2010/058379 | 5/2010 |
| WO | WO2012/083380 | 6/2012 |
| WO | WO2012/094805 | 7/2012 |
| WO | WO2014/018118 | 1/2014 |
| WO | WO2014/200766 | 12/2014 |
| WO | WO2015/034149 | 3/2015 |
| WO | WO 15/122885 | 8/2015 |
| WO | WO2015/116111 | 8/2015 |
| WO | WO2015/147756 | 10/2015 |
| WO | WO2016080669 | 5/2016 |
| WO | WO2016/104922 | 6/2016 |
| WO | WO2016155761 | 10/2016 |
| WO | WO 16/208835 | 12/2016 |
| WO | WO2016196171 | 12/2016 |
| WO | WO2016208835 | 12/2016 |
| WO | WO2017013278 | 1/2017 |
| WO | WO 18/236553 | 12/2018 |
| WO | WO2020173085 | 9/2020 |

OTHER PUBLICATIONS

M.T. Raghunath et al., User Interfaces for Applications on a Wrist Watch, Personal and Ubiquitous Computing, vol. 6, No. 1, 2002, Springer.

Author Unknown, "Desirable Android Wear smartwatch from LG," Gulf News, Dubai, 3 pages, Jan. 30, 2015.

Author Unknown, "Fossil Q ups smartwatch game with handsome design and build," Business Mirror, Makati City, Philippines, 3 pages, Dec. 20, 2016.

Author Unknown, "How Vesag Helps Kids Women and Visitors," http://www.sooperarticles.com/health-fitness-articles/children-health-articles/how-vesag-helps-kids-women-visitors-218542.html, 2 pages, at least as early as May 20, 2015.

Author Unknown, "mHealth," http://mhealth.vesag.com/?m=201012, 7 pages, Dec. 23, 2010.

Author Unknown, "mHealth Summit 2010," http://www.virtualpressoffice.com/eventsSubmenu.do?page=exhibitorPage&showId=1551&companyId=5394, 5 pages, Nov. 18, 2010.

Author Unknown, "MyKronoz ZeTime: World's Most Funded Hybrid Smartwatch Raised over $3M on Kickstarter, Running until April 27," Business Wire, New York, New York, 3 pages, Apr. 21, 2017.

Author Unknown, "RedEye mini Plug-in Universal Remote Adapter for iPhone, iPod touch and iPad," Amazon.com, 4 pages, date unknown.

Author Unknown, "Re iPhone Universal Remote Control—Infrared Remote Control Accessory for iphone and ipod touch," http://www.amazon.com/iPhone-Universal-Remote-Control-Accessory/dp/tech-data/B0038Z4 . . . , 2 pages, at least as early as Jul. 15, 2010.

Author Unknown, "Vesag Wrist Watch for Dementia Care from VYZIN," http://vyasa-kaaranam-ketkadey.blogspot.com/2011/03/vesag-wrist-watch-for-dementia-care.html, 2 pages, Mar. 31, 2011.

Author Unknown, "Vyzin Electronics Private Limited launches "Vesag Watch, http://www.virtualpressoffice.com/showJointPage.do?page=jp&showId=1544, 5 pages, Jan. 6, 2011.

Author Unknown, "Vyzin Unveiled Personal Emergency Response System (PERS) with Remote Health Monitoring That Can Be Used for Entire Family," http://www.24-7pressrelease.com/press-release/vyzin-unveiled-personal-emergency-response-system-pers-with-remote-health-monitoring-that-can-be-used-for-entire-family-219317.php, 2 pages, Jun. 17, 2011.

Author Unknown, "DeskThorityNet, Optical Switch Keyboards," http://deskthority.net/keyboards-f2/optical-switch-keyboards-t1474.html, 22 pages, Jul. 11, 2015.

Epstein et al., "Economical, High-Performance Optical Encoders," Hewlett-Packard Journal, pp. 99-106, Oct. 1988. [text only version].

Greyb, "Google Watch: Convert your arm into a keyboard," http://www.whatafuture.com/2014/02/28/google-smartwatch/#sthash.Yk35cDXK.dpbs, 3 pages, Feb. 28, 2014.

IBM, "Additional Functionality Added to Cell Phone via "Learning" Function Button," www.ip.com, 2 pages, Feb. 21, 2007.

Kim, Joseph, "2010 mHealth Summit Emerges as Major One-Stop U.S. Venue for Mobile Health," http://www.medicineandtechnology.com/2010/08/2010-mhealth-summit-emerges-as-major.html, 3 pages, Aug. 26, 2010.

Krishnan et al., "A Miniature Surface Mount Reflective Optical Shaft Encoder," Hewlett-Packard Journal, Article 8, pp. 1-6, Dec. 1996.

Rick, "How VESAG Helps Health Conscious Citizens," http://sensetekgroup.com/2010/11/29/wireless-health-monitoring-system/, 2 pages, Nov. 29, 2010.

Sadhu, Rajendra, "How VESAG Helps People Who Want to 'Be There'?," http://ezinearticles.com/?How-Vesag-Helps-People-Who-Want-to-Be-There?&id=5423873, 1 page, Nov. 22, 2010.

(56) References Cited

OTHER PUBLICATIONS

Sadhu, Rajendra, "Mobile Innovation Helps Dementia and Alzheimer's Patients," http://www.itnewsafrica.com/2010/11/mobile-innovation-helps-dementia-andalzheimer%E2%80%99s-patients/, 3 pages, Nov. 22, 2010.
Sherr, Sol, "Input Devices," p. 55, Mar. 1988.
Tran et al., "Universal Programmable Remote Control/Telephone," www.ip.com, 2 pages, May 1, 1992.

* cited by examiner

LASER-BASED ROTATION SENSOR FOR A CROWN OF AN ELECTRONIC WATCH

FIELD

The described embodiments relate generally to electronic devices, and more particularly to a crown for a wearable electronic device.

BACKGROUND

Electronic devices frequently use physical input devices to facilitate user interaction. For example, buttons, keys, dials, and the like can be physically manipulated by users to control operations of the device. Physical input devices may use various types of sensing mechanisms to translate the physical manipulation to signals usable by the electronic device. For example, buttons and keys may use collapsible dome switches to detect presses, while dials and other rotating input devices may use encoders or resolvers to detect rotational movements.

SUMMARY

An electronic watch includes a housing and a crown assembly including a rotatable actuation member. The rotatable actuation member includes a knob external to the housing and configured to receive a rotational input and a shaft assembly coupled to the knob and positioned at least partially within the housing, the shaft assembly defining a sensing surface configured to rotate in response to the rotational input. The electronic watch further includes an optical sensing system configured to detect the rotational input, the detecting including directing light onto the sensing surface, receiving reflected light from the sensing surface, and producing a signal corresponding to a rotational motion of the sensing surface, the signal based at least in part on an interference between the light directed onto the sensing surface and the reflected light. The shaft assembly may include a disk member, and the sensing surface may be a planar surface of the disk member.

The electronic watch may be configured to determine a speed and a direction of the rotational motion of the sensing surface based on the signal. The electronic watch may further include a display positioned at least partially within the housing and configured to display a graphical output, a transparent cover coupled to the housing, and a touch sensor positioned below the transparent cover and configured to detect touch inputs applied to the transparent cover, and the electronic watch may be configured to modify the graphical output in accordance with the speed and the direction of the rotational motion of the sensing surface.

A beam axis of the light directed onto the sensing surface may be oblique to the sensing surface. The light directed onto the sensing surface may include a laser beam, the reflected light may be a reflected portion of the laser beam, and the optical sensing system may include a laser module configured to emit the laser beam and receive the reflected portion of the laser beam. The laser module may be a vertical cavity surface emitting laser, the vertical cavity surface emitting laser may detect a difference in frequency between the emitted laser beam and the reflected portion of the laser beam, and the signal may be based at least in part on the difference in frequency. The laser beam may be a first laser beam, the laser module may be a first laser module, and the optical sensing system may further include a second laser module configured to emit a second laser beam, the second laser beam being directed onto the sensing surface, and receive a reflected portion of the second laser beam.

An electronic watch may include a housing, a crown assembly configured to receive a rotational input and defining a sensing surface at least partially within the housing and configured to rotate in response to the rotational input, and an optical sensing system comprising a laser module configured to emit a beam of coherent light and receive a reflected portion of the beam, the reflected portion of the beam reflected from the sensing surface of the crown assembly. The optical sensing system may be configured to produce a signal corresponding to a rotational motion of the sensing surface of the crown assembly, the signal based at least in part on a difference in frequency between the emitted beam and the reflected portion of the beam.

A rotational motion in a first direction may correspond to the reflected portion of the beam having a lower frequency than the emitted beam and a rotational motion in a second direction opposite the first direction may correspond to the reflected portion of the beam having a higher frequency than the emitted beam.

A rotational motion in a first direction and having a first rotational speed may correspond to the reflected portion of the beam having a first frequency and a rotational motion in the first direction and having a second rotational speed may correspond to the reflected portion of the beam having a second frequency that is different from the first frequency. The first rotational speed may be higher than the second rotational speed, and the first frequency may be higher than the second frequency. The emitted beam may have a third frequency, and the first frequency and the second frequency may be different than the third frequency.

The emitted beam may be directed onto the sensing surface in a first direction along a path, the reflected portion of the beam may be reflected from the sensing surface in a second direction along the path, the second direction opposite to the first direction, and an incident portion of the beam may be not perpendicular to the sensing surface of the crown assembly. The laser module may be a vertical cavity surface emitting laser, the reflected portion of the beam may change at least one of a frequency or an amplitude of light produced by the vertical cavity surface emitting laser, and the change of the at least one of the frequency or the amplitude of the light produced by the vertical cavity surface emitting laser may correspond to the difference in frequency between the emitted beam and the reflected portion of the beam. The difference in frequency between the emitted beam and the reflected portion of the laser beam may be caused by a Doppler effect.

An electronic device may include a housing, a crown assembly configured to receive a rotational input and defining a sensing surface at least partially within the housing and configured to rotate in response to the rotational input, and an optical sensing system comprising a laser module configured to emit a laser beam, the emitted laser beam directed along a path segment in a first direction onto the sensing surface, and receive a reflected portion of the laser beam, the reflected portion reflected from the sensing surface and travelling along the path segment in a second direction opposite to the first direction. The optical sensing system may be configured to produce a signal corresponding to a rotational motion of the sensing surface of the crown assembly, the signal based at least in part on an interaction between the emitted laser beam and the reflected portion of the laser beam. The path segment in some cases does not intersect a rotational axis of the shaft. The optical sensing system may further include a beam-directing structure configured to aim the laser beam along the path segment. The beam-directing structure may define a reflecting surface configured to aim the laser beam along the path segment. The electronic device may further include a collar attached to the housing and configured to retain the crown assembly to the housing, the beam-directing structure may be coupled to a mounting structure, and the mounting structure may be adhered to the collar, thereby fixing the orientation of the beam-directing structure relative to the crown assembly.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
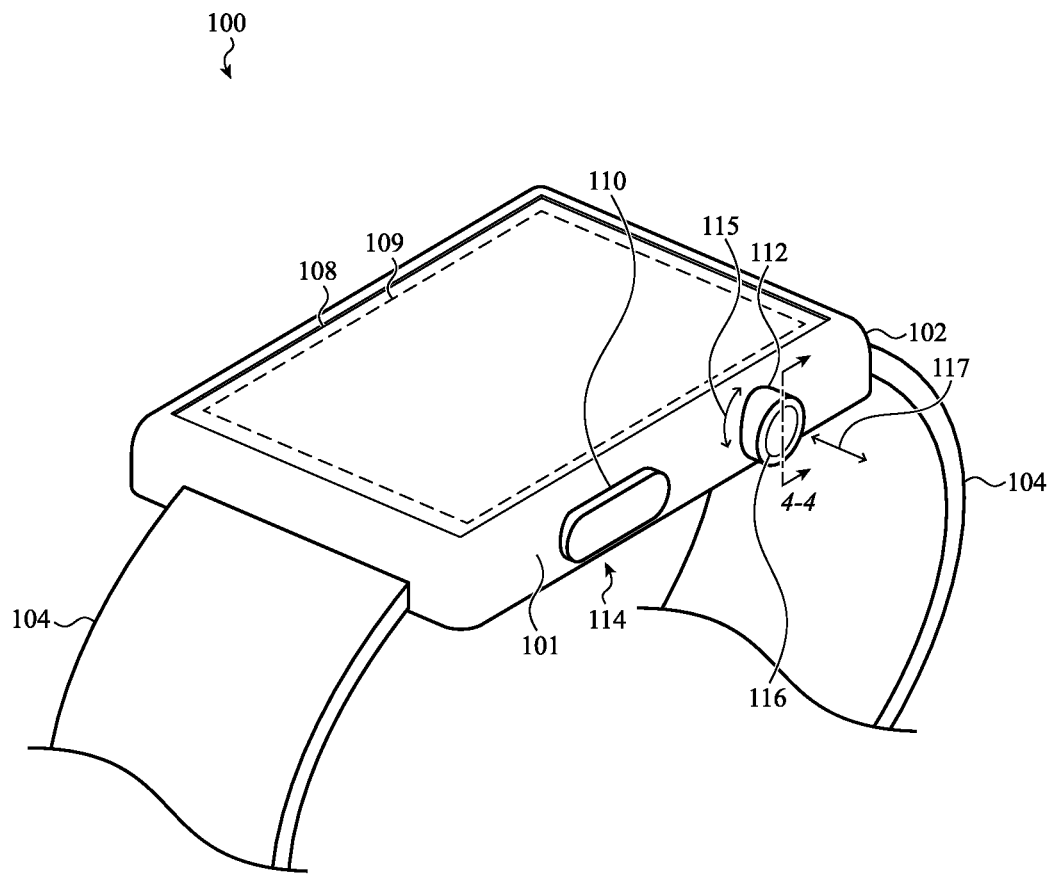
FIGS. 1A-1B depict an example wearable electronic device.

Reference will now be made in detail to representative embodiments illustrated in the accompanying drawings. It should be understood that the following description is not intended to limit the embodiments to one preferred embodiment. To the contrary, it is intended to cover alternatives, modifications, and equivalents as can be included within the spirit and scope of the described embodiments as defined by the appended claims.

The embodiments herein are generally directed to a crown of a wearable electronic device, such as an electronic watch (also referred to as a "smart watch" or simply a "watch"), and more particularly to a crown that can be manipulated by a user to provide inputs to the device. For example, the crown may accept rotational inputs, in which a user spins, twists, turns, or otherwise rotates the crown about a rotation axis. Rotational inputs may be used to control operations of the device. For example, a rotational input may modify a graphical display of the device in accordance with a direction of rotation of the crown, such as to scroll through lists, select or move graphical objects, move a cursor among objects on a display, or the like. The crown may also accept translational inputs, in which a user pushes or presses on the end of the crown (e.g., along the rotation axis). Translational inputs may be used to indicate a selection of an item displayed on a display, change a display mode (e.g., to activate a display), change between or among graphical interface modes, or the like. In some cases, a crown may also act as a contact point for a sensor, such as a biometric sensor, of the device. For example, a smart watch may include a heart rate sensor, an electrocardiograph sensor, a thermometer, a photoplethysmograph sensor, a fingerprint sensor, or the like, all of which are examples of biometric sensors that measure or detect some aspect of a user's body. Such sensors may require direct contact with the user's body, such as via a finger. Accordingly, the crown may include an external component, such as a window, electrode, or the like, that a user may touch in order to allow the biometric sensor to take a reading or measurement. In some cases, electrical signals may be transmitted through the crown to internal sensors via a conductive path defined by and/or through the crown.

In order to respond to a rotational input applied to a crown, a sensing system is used to detect the speed and/or direction of the crown. Described herein are laser-based sensing systems that can accurately detect the speed and direction of a crown rotation to a high degree of accuracy, while occupying a small space in the device and allowing for simpler and more efficient manufacturing processes. For example, a laser-based system as described herein may use laser emitters, such as vertical-cavity surface-emitting lasers (VCSELs), to direct a laser beam (e.g., a beam of coherent light) onto a rotating surface of the crown. The laser beams may be aimed at the rotating surface in such a way that some of the light from the laser beam is directed back into the laser emitter, and the effect of the reflected light on the laser emitter may be used to determine the speed and direction of the rotation. More particularly, the laser beams may be aimed at the rotating surface at an angle that is oblique to the surface (e.g., not perpendicular to or parallel to the rotating surface at the area of incidence of the laser beam). In this configuration, the motion of the rotating surface affects the frequency of the reflected light. For example, if the rotating surface (e.g., a shaft) is rotating in one direction, the frequency of the reflected light may be higher than that of the incident light, and if the shaft is rotating in the opposite direction, the frequency of the reflected light may be lower than that of the incident light. Moreover, a greater rotational speed produces a greater shift in frequency of the reflected light. Thus, a higher speed of rotation will result in a larger frequency shift of the reflected light, as compared to a lower speed of rotation.

The difference in the frequency of the emitted light and the reflected light may have an effect on the laser emitter that can be used to detect the speed and direction of rotation of the crown. For example, when the reflected light is received by the laser emitter (while the laser emitter is also emitting light), the reflected light may cause a change in a frequency, amplitude, and/or other property(s) of the light being produced by the laser. These changes may be detected by the laser (and/or associated components and circuitry) and used to generate a signal that corresponds to a rotational motion of the crown. The signal may then be used to control functions of the device, such as to modify graphical outputs being displayed on the device.

Notably, this sensing system can sense the rotation of a surface that lacks optical treatments or other optically or visually distinct features, such as contrasting colors, facets, slots, or the like. Rather, as long as some of the incident light is reflected along the same optical path back into the laser, the sensing system can determine the speed and direction of the crown rotation. Thus, the use of the laser-based sensing system described herein may provide robust and highly accurate rotation sensing and may eliminate the need to form precision optical treatments or features on rotating surfaces of the crown.

FIG. 1A depicts an electronic device 100 (also referred to herein simply as a device 100). The device 100 is depicted as a watch, though this is merely one example embodiment of an electronic device, and the concepts discussed herein may apply equally or by analogy to other electronic devices, including mobile phones (e.g., smartphones), tablet computers, notebook computers, head-mounted displays, headphones, earbuds, digital media players (e.g., mp3 players), or the like.

The device 100 includes a housing 102 and a band 104 coupled to the housing. The housing 102 may at least partially define an internal volume in which components of the device 100 may be positioned. The housing 102 may also define one or more exterior surfaces of the device, such as all or a portion of one or more side surfaces, a rear surface, a front surface, and the like. The housing 102 may be formed of any suitable material, such as metal (e.g., aluminum, steel, titanium, or the like), ceramic, polymer, glass, or the like. The band 104 may be configured to attach the device 100 to a user, such as to the user's arm or wrist. The device 100 may include battery charging components within the device 100, which may receive power, charge a battery of the device 100, and/or provide direct power to operate the device 100 regardless of the battery's state of charge (e.g., bypassing the battery of the device 100). The device 100 may include a magnet, such as a permanent magnet, that is configured to magnetically couple to a magnet (e.g., a permanent magnet, electromagnet) or magnetic material (e.g., a ferromagnetic material such as iron, steel, or the like) in a charging dock (e.g., to facilitate wireless charging of the device 100).

The device 100 also includes a transparent cover 108 coupled to the housing 102. The cover 108 may define a front face of the device 100. For example, in some cases, the cover 108 defines substantially the entire front face and/or front surface of the device. The cover 108 may also define an input surface of the device 100. For example, as described herein, the device 100 may include touch and/or force sensors that detect inputs applied to the cover 108. The cover may be formed from or include glass, sapphire, a polymer, a dielectric, or any other suitable material.

The cover 108 may overlie at least part of a display 109 that is positioned at least partially within the internal volume of the housing 102. The display 109 may define an output region in which graphical outputs are displayed. Graphical outputs may include graphical user interfaces, user interface elements (e.g., buttons, sliders, etc.), text, lists, photographs, videos, or the like. The display 109 may include a liquid crystal display (LCD), an organic light emitting diode display (OLED), or any other suitable components or display technologies.

The display 109 may include or be associated with touch sensors and/or force sensors that extend along the output region of the display and which may use any suitable sensing elements and/or sensing systems and/or techniques. Using touch sensors, the device 100 may detect touch inputs applied to the cover 108, including detecting locations of touch inputs, motions of touch inputs (e.g., the speed, direction, or other parameters of a gesture applied to the cover 108), or the like. Using force sensors, the device 100 may detect amounts or magnitudes of force associated with touch events applied to the cover 108. The touch and/or force sensors may detect various types of user inputs to control or modify the operation of the device, including taps, swipes, multi-finger inputs, single- or multi-finger touch gestures, presses, and the like. Touch and/or force sensors usable with wearable electronic devices, such as the device 100, are described herein with respect to FIG. 11.

The device 100 also includes a crown 112 (also referred to herein as a crown assembly) having a knob, external portion, or component(s) or feature(s) positioned along a side wall 101 of the housing 102. At least a portion of the crown 112 (e.g., a knob 208, FIG. 2) may protrude from and/or be generally external to the housing 102 and may define a generally circular shape or a circular exterior surface. The exterior surface of the crown 112 (or a portion thereof) may be textured, knurled, grooved, or may otherwise have features that may improve the tactile feel of the crown 112. At least a portion of the exterior surface of the crown 112 may also be conductively coupled to biometric sensing circuitry (or circuitry of another sensor that uses a conductive path to an exterior surface), as described herein.

The crown 112 may facilitate a variety of potential user interactions. For example, the crown 112 may be rotated by a user (e.g., the crown may receive rotational inputs). The arrow 115 in FIG. 1A illustrates example direction(s) of rotational inputs to the crown 112. Rotational inputs to the crown 112 may zoom, scroll, rotate, or otherwise manipulate a user interface or other object displayed on the display 109 (among other possible functions). The crown 112 may also be translated or pressed (e.g., axially) by the user, as indicated by arrow 117. Translational or axial inputs may select highlighted objects or icons, cause a user interface to return to a previous menu or display, or activate or deactivate functions (among other possible functions). As described herein, rotational inputs may be sensed using an optical sensing system that uses one or more lasers to detect the speed and/or direction of the rotational inputs. More particularly, interference (or other interaction) between the laser light that is directed onto a rotating surface and the laser light that is reflected from the rotating surface back into the laser source. Self-mixing laser interferometry may be used to determine characteristics of the rotation (e.g., speed and/or direction) based on the reflected light.

The crown 112 may also include or define an input feature 116 that facilitates input to biometric sensing circuitry or other sensing circuitry within the device 100. The input feature 116 may be a conductive surface that is conductively coupled, via one or more components of the device 100, to the biometric sensing circuitry. The input feature 116 may be a conductive member (e.g., a cap or disk) that is part of the crown assembly. In some cases, the input feature 116 and/or the component(s) that define the input feature 116 are electrically isolated from other components of the device 100. For example, the input feature 116 may be electrically isolated from the housing 102. In this way, the conductive path from the input feature 116 to the biometric sensing circuitry may be isolated from other components that may otherwise reduce the effectiveness of the biometric sensor. In order to provide an input to the biometric sensor, a user may place a finger or other body part on the input feature 116. The biometric sensor may be configured to take a reading or measurement in response to detecting that the user has placed a finger or other body part on the input feature 116. In some cases, the biometric sensor may only take a reading or measurement when a sensing function is separately initiated by a user (e.g., by activating the function via a graphical user interface). In other cases, a reading or measurement is taken any time the user contacts the input feature 116 (e.g., to provide a rotational or translational input to the crown 112). The user may have full control over when the biometric sensor takes measurements or readings and may even have the option to turn off the biometric sensing functionality entirely.

The device 100 may also include one or more haptic actuators that are configured to produce a tactile output through the crown 112. For example, the haptic actuator may be coupled to the crown 112 and may be configured to impart a force to the crown 112. The force may cause the crown 112 to move (e.g., to oscillate or vibrate translationally and/or rotationally, or to otherwise move to produce a tactile output), which may be detectable by a user when the user is contacting the crown 112. The haptic actuator may produce tactile output by moving the crown 112 in any suitable way. For example, the crown 112 (or a component thereof) may be rotated (e.g., rotated in a single direction, rotationally oscillated, or the like), translated (e.g., moved along a single axis), or pivoted (e.g., rocked about a pivot point). In other cases, the haptic actuator may produce tactile outputs using other techniques, such as by imparting a force to the housing 102 (e.g., to produce an oscillation, vibration, impulse, or other motion), which may be perceptible to a user through the crown 112 and/or through other surfaces of the device 100, such as the cover 108, the housing 102, or the like. Any suitable type of haptic actuator and/or technique for producing tactile output may be used to produce these or other types of tactile outputs, including electrostatics, piezoelectric actuators, oscillating or rotating masses, ultrasonic actuators, reluctance force actuators, voice coil motors, Lorentz force actuators, or the like.

Tactile outputs may be used for various purposes. For example, tactile outputs may be produced when a user presses the crown 112 (e.g., applies an axial force to the crown 112) to indicate that the device 100 has registered the press as an input to the device 100. As another example, tactile outputs may be used to provide feedback when the device 100 detects a rotation of the crown 112 or a gesture being applied to the crown 112. For example, a tactile output may produce a repetitive "click" sensation as the user rotates the crown 112 or applies a gesture to the crown 112. Tactile outputs may be used for other purposes as well.

The device 100 may also include other inputs, switches, buttons, or the like. For example, the device 100 includes a button 110. The button 110 may be a movable button (as depicted) or a touch-sensitive region of the housing 102. The button 110 may control various aspects of the device 100. For example, the button 110 may be used to select icons, items, or other objects displayed on the display 109, to activate or deactivate functions (e.g., to silence an alarm or alert), or the like.

Figure 1B:
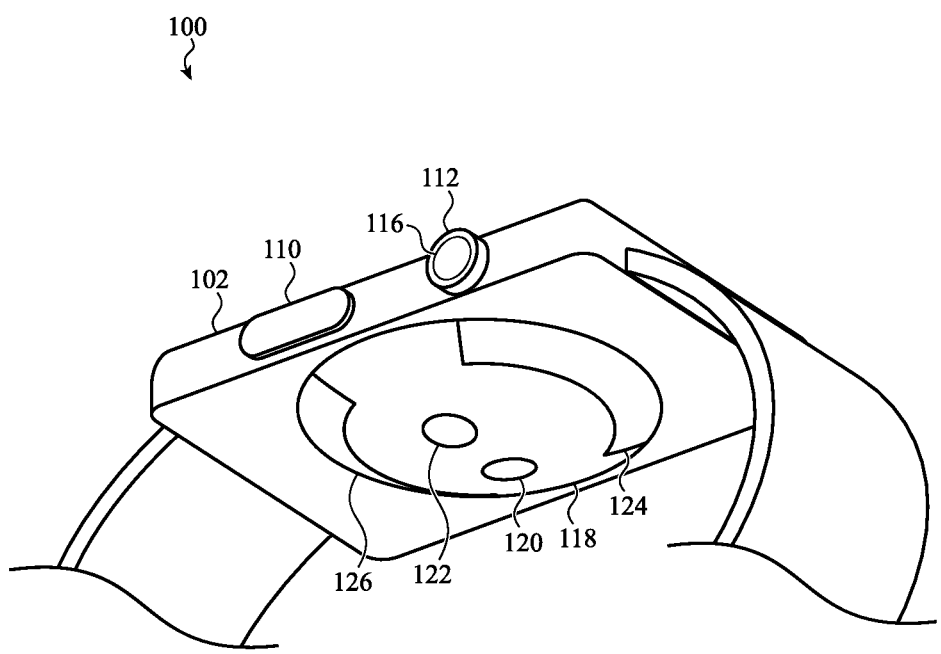

FIG. 1B shows a rear side of the device 100. The device 100 includes a rear cover 118 coupled to the housing 102 and defining at least a portion of the rear exterior surface of the device 100. The rear cover 118 may be formed of or include any suitable material(s), such as sapphire, polymer, ceramic, glass, or any other suitable material.

The rear cover 118 may define a plurality of windows to allow light to pass through the rear cover 118 to and from sensor components within the device 100. For example, the rear cover 118 may define an emitter window 120 and a receiver window 122. While only one each of the emitter and receiver windows are shown, more emitter and/or receiver windows may be included (with corresponding additional emitters and/or receivers within the device 100). The emitter and/or receiver windows 120, 122 may be defined by the material of the rear cover 118 (e.g., they may be light-transmissive portions of the material of the rear cover 118), or they may be separate components that are positioned in holes formed in the rear cover 118. The emitter and receiver windows, and associated internal sensor components, may be used to determine biometric information of a user, such as heart rate, blood oxygen concentrations, and the like, as well as information such as a distance from the device to an object. The particular arrangement of windows in the rear cover 118 shown in FIG. 1B is one example arrangement, and other window arrangements (including different numbers, sizes, shapes, and/or positions of the windows) are also contemplated. As described herein, the window arrangement may be defined by or otherwise correspond to the arrangement of components in the integrated sensor package.

The rear cover 118 may also include one or more electrodes 124, 126. The electrodes 124, 126 may facilitate input to biometric sensing circuitry or other sensing circuitry within the device 100 (optionally in conjunction with the input feature 116). The electrodes 124, 126 may be a conductive surface that is conductively coupled, via one or more components of the device 100, to the biometric sensing circuitry.

Figure 2A:
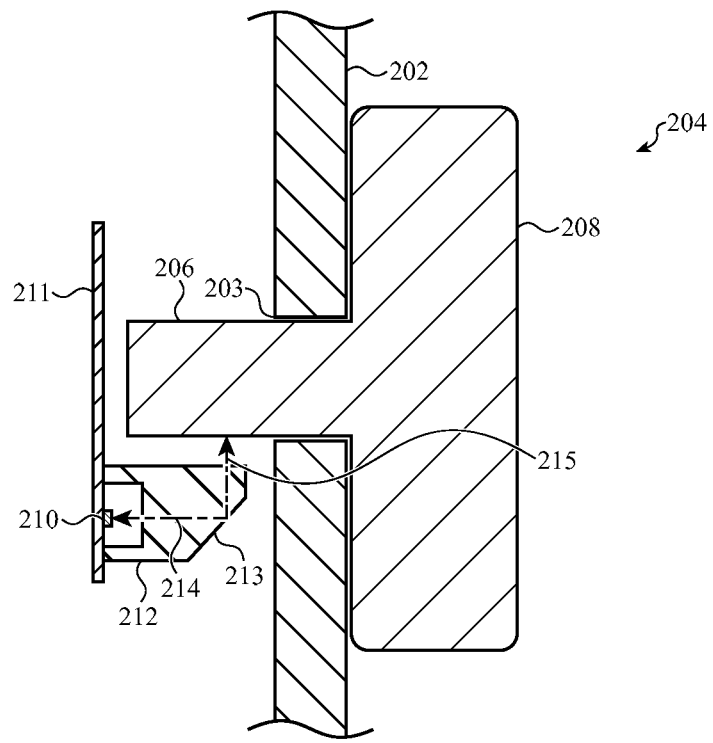
FIGS. 2A-2B depict a schematic illustration of an example rotational sensing system.

FIG. 2A depicts a partial cross-sectional view of a portion of an electronic device having a crown assembly and an optical sensing system configured to detect a characteristic of the rotational input of the crown assembly. More particularly, the optical sensing system depicted in FIG. 2A has one or more laser emitters that direct laser beams onto a rotating surface of the crown assembly, and receive reflected portions of the laser beam to detect characteristics of the rotational input (e.g., speed and direction of rotation).

As shown in FIG. 2A, a device may include a housing with a side wall 202 having a through-hole 203. A crown assembly 204 may include a knob 208 that is external to the housing and configured to receive a rotational input, and a shaft assembly 206 that is coupled to the knob and extends through the through-hole 203 such that it is at least partially within the housing. The knob 208 and shaft assembly 206 may be a single unitary component, or they may include multiple components or pieces coupled together. In either case, a rotational input applied to the knob 208 causes the shaft assembly 206 (or at least a portion thereof) to rotate.

A laser emitter 210, which may be positioned on a substrate 211 such as a circuit board, is configured to emit a laser beam that is ultimately directed onto a rotating surface of the shaft assembly 206. As shown in FIG. 2A, the rotating surface is a peripheral surface of a shaft assembly, though in other implementations the laser beam(s) may be directed onto a different surface (e.g., a surface of a disk). A beam-directing structure 212 (e.g., a lens, refractor, prism, or other optical component or assembly) may be used to aim the laser beam along towards the surface of the shaft assembly. In some cases, the beam-directing structure 212 changes a direction of the laser beam. For example, as shown in FIG. 2A, the beam-directing structure 212 defines a reflecting surface 213 that changes the direction of the laser beam so that a portion of the laser beam is incident on the shaft assembly 206. In other cases, the sensing system may not include a beam-directing structure, or it may include a different beam-directing structure or beam-directing structures.

As used herein, an incident beam refers to a segment or portion of a laser beam that is incident on the sensing surface of a shaft assembly (or another rotating component of a crown assembly). Thus, for example, FIG. 2A illustrates an implementation in which a laser beam emitted from the laser emitter 210 is redirected by the beam-directing structure 212. The portion 215 of the laser beam that is incident on the surface of the shaft assembly 206 (e.g., after exiting the beam-directing structure 212) may be referred to as the incident beam. In some cases, the incident beam is the portion of a laser beam that passes through free space (e.g., air) immediately prior to being incident on the sensing surface. As described herein, the incident beam may be incident on the sensing surface of the shaft assembly 206 at an oblique angle (e.g., not perpendicular to or parallel to a tangent line or plane at the area of incidence of the incident beam on the sensing surface). Stated another way, the path along which the incident beam travels, which may be a segment of the overall path of the laser beam, may be oblique to the sensing surface.

Figure 3:
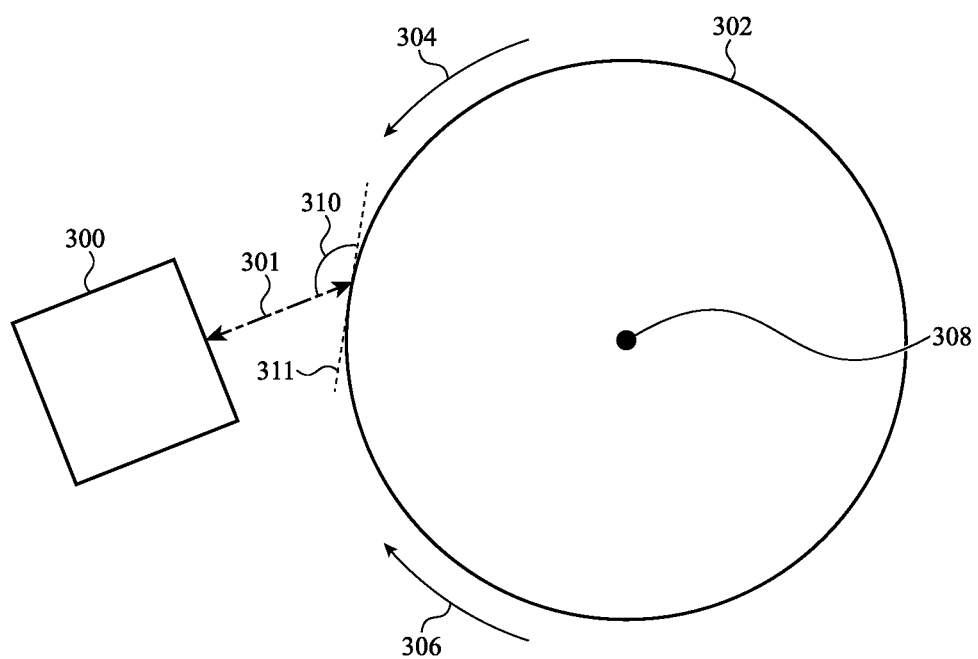
FIG. 3 depicts a schematic illustration of an example rotational sensing system.

FIG. 3 further illustrates the manner in which an incident beam is incident on a sensing surface of a shaft assembly. For example, FIG. 3 illustrates a terminal laser component 300, from which the incident beam 301 propagates. The terminal laser component 300 may be a beam-directing structure, such as the beam-directing structure 212 in FIG. 2A, a laser emitter, or any other component of an optical system that directs an incident beam onto a sensing surface of the shaft (e.g., emits the beam through free space, such as an air gap). As shown, the incident beam 301 is incident on the sensing surface 302 at an oblique angle 310 (e.g., not perpendicular to or parallel to a tangent line or plane 311 at the area of incidence of the incident beam 301 on the sensing surface 302). Stated another way, the path along which the incident beam 301 travels does not intersect a rotational axis of the shaft 308. The angle 310 may be between about 100 degrees and about 170 degrees, or any other suitable angle.

The oblique angle of the incident beam 301 on the sensing surface 302 results in a phenomenon that is used by the sensing system to determine the speed and direction of the rotation of the shaft assembly. In particular, a portion of the incident beam 301 is reflected from the sensing surface 302 along the same path as the incident beam 301, and ultimately reaches the laser emitter that produced the laser beam. When the incident beam 301 is incident on the sensing surface, the motion of the sensing surface causes the portion of the laser beam that is reflected back along the same path as the incident beam (referred to as the reflected portion) to have a different frequency than the incident beam. For example, if the sensing surface is rotating in a first direction 304, the frequency of the reflected portion of the beam may be higher than the frequency of the incident beam 301. If the sensing surface is rotating in a second direction 306 (e.g., opposite the first direction), the frequency of the reflected portion may be lower than the frequency of the incident beam 301. Moreover, as noted above, the speed of rotation (e.g., the rotational velocity) of the sensing surface may determine the extent to which the frequency is changed. Thus, higher rates of rotation correspond to greater shifts in the frequency as compared to the frequency of the incident beam.

Once the reflected portion of the beam reaches the laser emitter, the reflected light may cause a change in a frequency, amplitude, and/or other property(s) of the light being produced by the laser emitter, or may otherwise produce an effect in the resonator of the laser emitter. These changes and/or effects may be detected by the laser (and/or associated components and circuitry) and used to generate a signal that corresponds to a rotational motion of the crown. The signal may then be used to control functions of the device, such as to modify graphical outputs being displayed on the device.

As noted above, the effect that is ultimately used to determine the characteristics of the rotation is produced by the manner in which the moving sensing surface affects the frequency of the reflected light that returns to the light emitter. Accordingly, as long as the surface of the shaft assembly produces a sufficiently diffuse reflection such that at least some of the laser beam is reflected back along the same path (e.g., so that it travels back into the emitter), the sensing system can determine the speed and/or direction of the rotation. Notably, the shaft need not include facets, alternating color stripes or patterns, slots, or other visual or physical features in order to detect rotation characteristics. In some cases, the sensing surface may have a surface texture that facilitates reflection of the laser beam back along the path into the emitter. For example, the sensing surface may have a surface roughness (Ra) value of between about 0.025-10 microns. In some cases, the sensing surface may be characterized by a bidirectional reflectance distribution function (or other metric) in which a target amount or ratio of the reflected light is reflected back along the incident path.

Figure 2B:
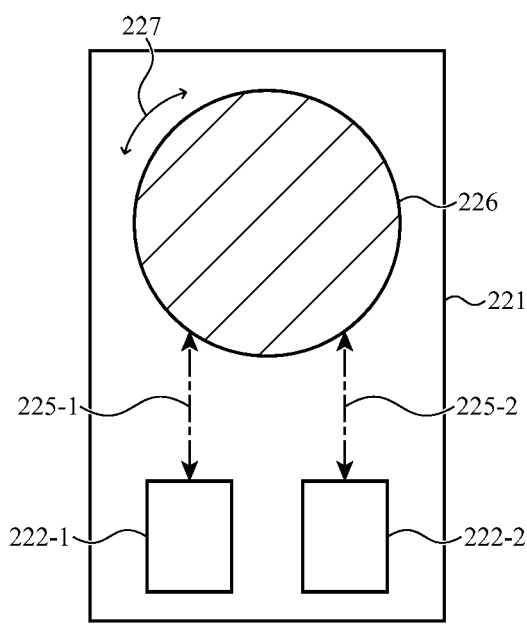

Optical sensing systems using the systems and techniques described herein may use one or multiple lasers in order to detect rotational characteristics. In cases where multiple lasers are used, the multiple lasers may be used to correct errors between different laser emitters, compensate for irregularities in the reflection from the sensing surface, or otherwise increase the reliability of the overall sensing system and/or the detected rotation characteristics. FIG. 2B illustrates an example implementation in which two laser sources are used. More particularly, FIG. 2B illustrates a partial cross-sectional view of a device, viewed from an axial end of a shaft assembly 226. The device includes two laser sources 221-1, 221-2 (including a laser emitter and optionally a beam-directing structure) mounted to a substrate 221 (e.g., a circuit board). The laser sources 221-1, 221-2 each emit a respective beam 225-1, 225-2 that is incident on the sensing surface of the shaft assembly 226. Each beam 225-1, 225-2 is incident on the surface at an oblique angle, as described above. The rotational characteristics determined from each laser source 221 may be used to determine a single set of rotational characteristics of the shaft assembly 226 (e.g., by averaging the respective rotational characteristics from each laser source, using one to error-check the other, etc.). Any implementation that is shown or described herein as using a single laser source (e.g., laser emitter and optional beam-directing structure) may, in other implementations, include multiple laser sources (e.g., two or more), as shown in FIG. 2B.

Figure 4:
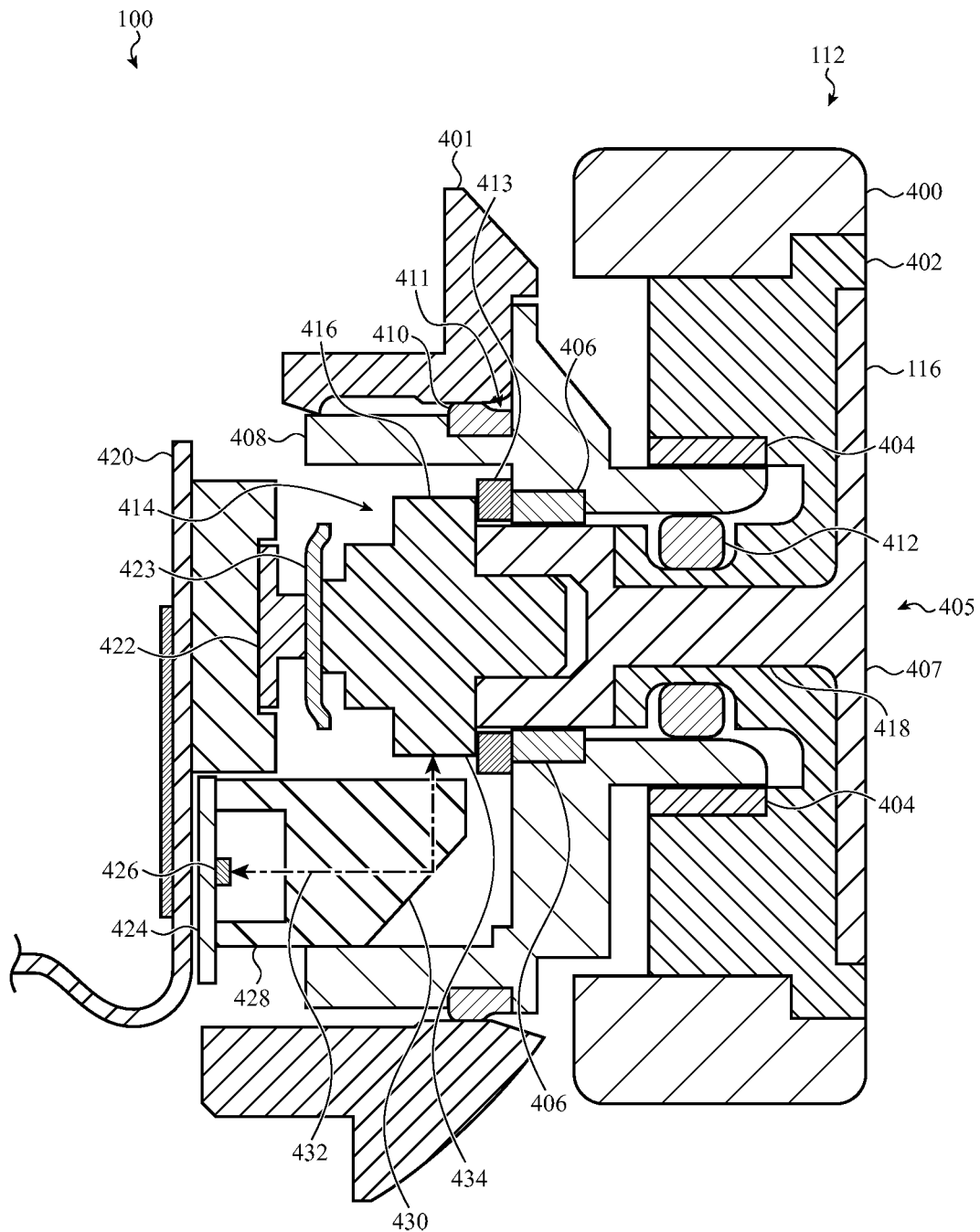
FIG. 4 depicts a partial cross-sectional view of an example input system for an electronic device.

FIG. 4 depicts a partial cross-sectional view of the device 100, viewed along line 4-4 in FIG. 1A, illustrating an example implementation of a crown and an optical sensing system as described herein. As shown, the device 100 includes a side wall 401, which is a side wall of the housing 102 (FIG. 1A). The side wall 401 has a through-hole 411 formed therethrough. A crown assembly 112, or a portion thereof, is positioned in the through-hole 411, and extends into an internal volume of the housing 102. A collar 408 may be positioned in the through-hole 411 and attached to the housing (e.g., via adhesives, clamps, fasteners, etc.), and a shaft assembly 414 of the crown assembly 112 may extend through a hole in the collar 408. The crown assembly 112 may be retained to the collar 408, and thereby retained to the housing 102. For example, the shaft assembly 414 may include a rotor 416 that is secured to the distal end of a shaft portion 418. The rotor 416 may define a shoulder or ledge that limits the outward movement of the crown. The shoulder may contact an internal portion of the housing or other stationary component during normal operation as a dome switch and/or a spring element may bias the crown outward.

A thrust bushing 413 (e.g., a bearing or bushing formed of or including a polymer, metal, or other suitable material)

may be positioned between the rotor 416 and an interior surface of the collar 408 to provide a friction surface along which the rotor 416 may slide during rotation of the crown assembly 112. A seal 410 may be provided between the collar 408 and the side wall 401 to seal the interface between the collar 408 and the side wall 401.

The crown assembly 112 may include a knob 405 (also referred to as a head or dial) that is external to the housing 102 and is configured to receive a rotational input. The knob 405 may comprise a ring member 400. The ring member may be formed from metal, polymer, and/or other suitable materials, and may include knurls, grooves, or other features to provide a desired tactile feel when grasped or otherwise contacted by a user (e.g., when providing a rotational input). The crown assembly 112 may also include a molded structure 402 that couples the ring member 400 to a cap assembly 407. The molded structure 402 may structurally couple the ring member 400 to the cap assembly 407, while also electrically isolating the cap assembly 407 from the ring member 400.

The crown assembly 112 may also include a shaft assembly 414 that is coupled to and/or extends from the knob and is positioned at least partially within the housing. The shaft assembly 414 may define a sensing surface 434 that is configured to rotate in response to a rotational input (e.g., when the knob 405 is rotated by a user). As noted above, the shaft assembly 414 may include a rotor 416 that defines a sensing surface 434. In some cases, a different component or portion of the shaft assembly 414 defines the sensing surface. For example, the shaft portion 418 of the cap assembly 407 may define the sensing surface. As another example, a sleeve positioned around the shaft portion 418 and/or the rotor 416 may define the sensing surface. As described herein, the sensing surface is configured to reflect at least a portion of an incident laser beam back into the laser emitter. In some cases, the surface has substantially uniform reflection properties (e.g., bidirectional reflectance distribution function) about its circumference, such that substantially the same proportion of the laser beam is reflected into the laser emitter regardless of the rotational position of the sensing surface. The rotor 416, or a surface thereof, may have a coating, plating, or other optical covering that gives a desired optical property to the sensing surface of the rotor.

The rotor 416 may be attached to the shaft portion 418, such as via a threaded connection. For example, an end of the shaft portion 418 (which may also be part of the shaft assembly 414) may define a threaded hole, and the rotor 416 may be threaded into the threaded hole. In other cases, the rotor 416 may be attached in a different manner (e.g., via adhesive, etc.).

As noted above, characteristics of a rotation of the crown assembly 112 may be detected by aiming a laser beam onto a surface of the crown assembly 112 (e.g., a rotor 416, as shown in FIG. 4), and receiving, at the laser emitter, a reflected portion of the laser beam. FIG. 4 illustrates one example implementation in which a laser module 426 emits a laser beam that is ultimately incident on the rotor 416. As shown in FIG. 4, the laser module 426 is attached to a substrate 424, such as a circuit board. The substrate 424 may be coupled to a circuit element 420, such as a flexible circuit element, which includes conductors that conductively couple the laser module 426 and/or other electrical components on the substrate 424 (e.g., via conductors in or on the substrate 424) to other circuitry and/or electronic components in the device (e.g., processors, memory, etc.).

The laser beam emitted from the laser module 426 may travel along the path 432. A beam-directing structure 428 may define at least part of the path 432 or otherwise aim or change the direction of the laser beam so that it is incident on the surface of the crown assembly 112 at the desired orientation and/or angle. For example, as shown in FIG. 4, the laser module 426 may emit the laser beam in a direction that is substantially parallel to the rotational axis of the crown assembly 112, and the beam-directing structure 428 may change the direction of the laser beam so that it is incident on the sensing surface 434 at the target angle. For example, the beam-directing structure 428 defines a reflecting surface 430 that is configured to change the direction of the emitted laser beam to aim the laser beam along the segment of the path 432 that extends to the sensing surface 434. The reflecting surface 430 may also change the direction of the reflected light so that it is aimed back into the laser module 426. The beam-directing structure 428 may include multiple optical elements (e.g., lenses, prisms, refractors, etc.) coupled together, or a single monolithic optical element. The beam-directing structure 428 may define reflecting surfaces, facets, or any other suitable optical features that define the path 432 of the laser beam from the laser module 426 to the sensing surface 434. In embodiments where the laser module 426 is configured to emit light along a different direction relative to a sensing surface (e.g., where the laser directs light onto a disk that is attached to the crown assembly), the beam-directing structure may be omitted or may have a different configuration. The beam-directing structure 428 may be formed from any suitable material(s), such as glass, a crystal or crystalline material, a polymer material, or the like.

While FIG. 4 shows one light path 432, it will be understood that the entire laser beam is not reflected back along the path 432 into the laser module. Rather, some portion of the laser beam will be scattered or reflected from the sensing surface along one or more different paths, while only a portion of the laser beam will be reflected back along the path 432.

The sensing surface 434 is configured to reflect at least a portion of the laser beam along the same path 432 and back into the laser module 426. Due at least in part to the angle at which the laser beam is incident on the sensing surface 434 (e.g., not perpendicular to the sensing surface 434 at the point where the beam is incident on the sensing surface), if the crown assembly 112 is rotating when the laser beam is incident, the reflected portion of the laser beam will have a different frequency than the emitted laser beam. The different frequency of the reflected laser light may affect the operation of the laser module 426 in a manner that can be used to determine the speed and/or direction of rotation of the crown assembly 112, as described herein.

As noted above, the crown of a device may include or define an input feature 116 that can be used to facilitate biometric sensing functions. For example, the cap assembly 407 and rotor 416 may define a conductive path between the input feature 116 and a biometric sensor of the device, such as an ECG sensor. The cap assembly 407 may be formed of a conductive material (e.g., a metal) and may define an input feature 116 (e.g., a disk-like feature) on the axial end surface of the crown assembly 112, as well as the shaft portion 418. Further, the rotor 416 may also be formed of a conductive material (e.g., metal). Accordingly, a user can touch a finger or other body part to the input feature 116, and the biometric sensor can detect electrical characteristics of the user's body through the cap assembly 407 (and optionally the rotor 416).

The crown assembly 112 may be supported by guide members 404 and 406. The guide members 404, 406 may be bushings, bearings, or the like. The guide member 404 may be attached to the crown assembly 112 (e.g., attached to the molded member 402 or another component or portion of the crown assembly 112), or it may be attached to the collar 408. Similarly, the guide member 406 may be attached to the crown assembly 112 (e.g., attached to the shaft assembly 414), or it may be attached to the collar 408. In some cases, the guide member 404 is attached to the crown assembly 112, while the guide member 406 is attached to the collar 408. The crown assembly 112 and/or the collar 408 may be configured to slide along a surface of the guide members 404, 406 when the crown assembly 112 is rotated. In some cases, the guide members 404, 406 include one or more coatings to reduce friction and/or provide a target coefficient of friction between them and their respective contact surfaces, thereby providing a desired resistance to rotation and/or tactile feel when rotated by a user.

A seal 410 (e.g. a first seal) may be positioned between the collar 408 and the housing (e.g., the side wall 401) to inhibit ingress of water, liquids, or other contaminants into the device. The seal 410 may be an elastomeric or other compliant or compressible material and may be compressed or otherwise deformed to form intimate contact with the surfaces of the housing and the collar 408. A seal 412 (e.g., a second seal) may be positioned between the crown assembly 112 and the collar 408 to inhibit ingress of water, liquids, or other contaminants into the device. The seal 412 may be an elastomeric or other compliant or compressible material and may be compressed or otherwise deformed to form intimate contact with the surfaces of the crown assembly 112 and the collar 408. In some cases, the seal 412 is or resembles an O-ring. One or more of the surfaces in contact with the seal 412 may slide along a surface of the seal 412 to maintain the seal during rotation and/or translation of the crown assembly 112.

As noted above, the crown assembly 112 may be translatable along its axis (e.g., in response to an input force applied to the axial end of the crown assembly 112) to provide an input to the device. In order to detect the axial input, the device 100 may include a switch 422 (e.g., a dome switch) that is configured to be actuated by an end of the crown assembly 112. The switch 422 may be attached to a substrate, such as a circuit board (optionally the same circuit board that the laser module 426 is attached to). The switch 422 may be a dome switch, which may provide electrical switching functionality (e.g., closing a circuit upon actuation by the crown assembly 112) as well as a tactile output that may be felt or otherwise perceived by the user. For example, the user may feel a click, detent, or other sensation upon the collapse of the dome switch, thus indicating to the user that an input has been successfully provided to the device 100. In some cases, other types of switches or force sensing components may be used to detect axial inputs, which may be positioned similarly to the switch 422 in FIG. 4.

In some cases a friction guard 423 (or shear plate or wear plate), or a portion thereof, is positioned between the switch 422 and the rotor 416 (or between the switch 422 and a different portion of the crown assembly 112, in cases where a rotor 416 is not used). Axial forces from the crown assembly 112 may be transferred to the switch 422 through the friction guard 423. Because the friction guard 423 does not rotate, any friction due to rotation of the crown assembly 112 is applied to the friction guard 423 and not to the switch 422. This may help extend the life of the switch 422 by preventing the friction from damaging the outer surface of the switch 422, for example.

Figure 5:
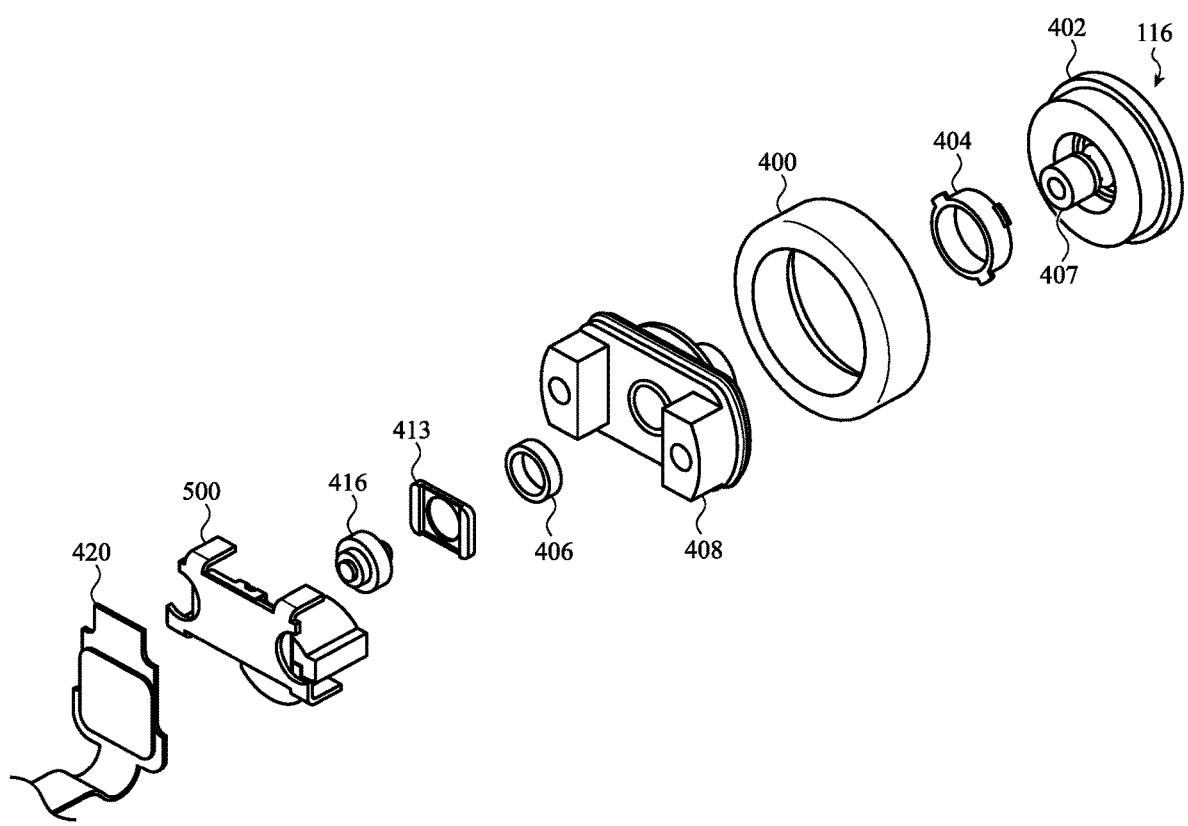
FIG. 5 depicts an exploded view of the input system of FIG. 4.

FIG. 5 is an exploded view of the input system of FIG. 4, illustrating additional details of the input system. In some cases, the molded structure 402 may be coupled to the cap assembly 407, such as by molding a polymer material against the cap assembly 407 to form and attach the molded structure 402 to the cap assembly 407. A guide member 404 (e.g., a bushing, bearing, etc.) may be attached to the molded structure 402. The ring member 400 may be attached to the molded structure 402. In some cases, the guide member 404 and the ring member 400 are attached to the molded structure 402 during the molding process. For example, the guide member 404, the ring member 400, and the cap assembly 407 may be inserted into a mold, and a flowable polymer material may be introduced into the mold to contact, engage with, and ultimately attach to the guide member 404, the ring member 400, and the cap assembly 407, thereby forming a single assembly that can be built into the system.

A guide member 406 may be attached to the collar 408 (e.g., via interference-fit, adhesive, insert molding, etc.). The thrust bushing 413 may also be attached to the collar 408. The cap assembly 407 may be inserted into a hole in the collar 408, and the rotor 416 may then be coupled to the cap assembly 407. Once the crown assembly 112 is coupled to the collar 408 (as described above or via any other suitable process or technique), a sensing assembly 500 may be attached to the collar 408. The sensing assembly 500 may include a laser module, beam-directing structure, beam-directing structure mounting structure, substrate, and/or other suitable components, as described herein. The sensing assembly 500 may be pre-assembled and then aligned relative to the crown assembly 112 (and in particular the sensing surface 434) prior to being secured to the collar 408. The circuit element 420 may be coupled to the sensing assembly 500 to conductively couple the sensing assembly 500 to other electrical components (e.g., processors, memory, and/or other circuit components). The sensing assembly 500 may also include a force or pressure sensor that is configured to detect translational movement (or axial forces) applied to the crown assembly, such as the switch 422 (FIG. 4), a force sensor, or the like. In some implementations, once all of the components shown in FIG. 5 (optionally excluding the circuit element 420) are assembled together, the resulting assembly may be attached to a device housing, such as by positioning the collar 408 in a through-hole or other feature of a device, securing the collar 408 to the housing (via adhesive, fasteners, or the like), and ultimately conductively coupling the electrical components of the assembly to other components of the device.

Figure 6:
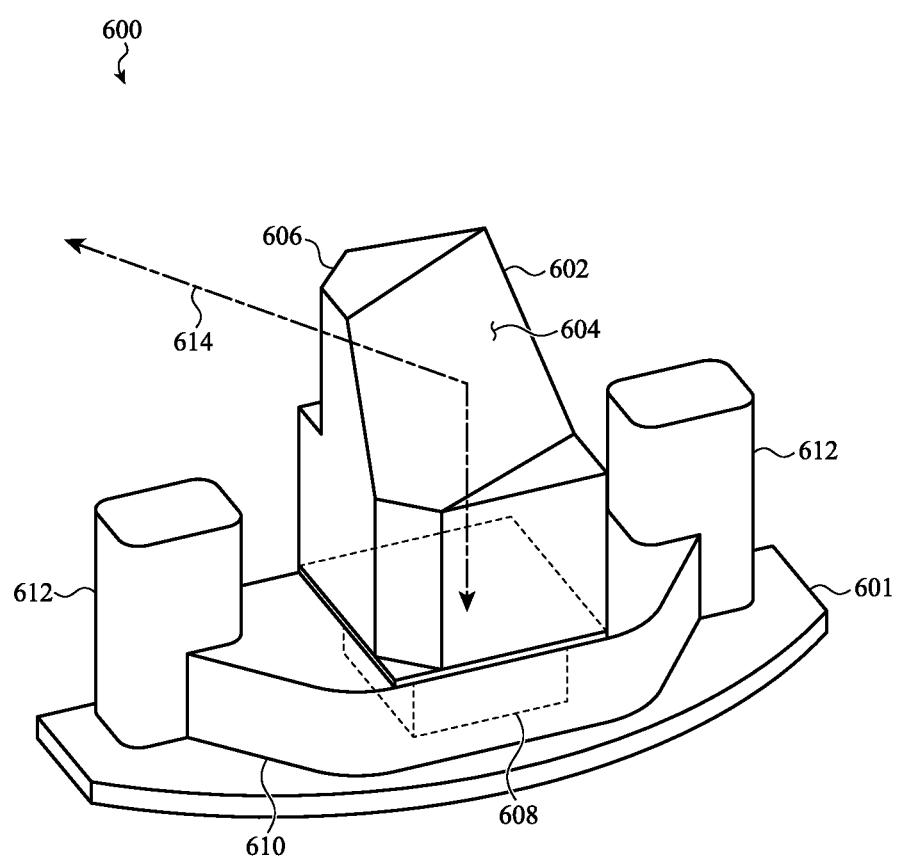
FIG. 6 depicts a portion of an optical sensing system for sensing rotational inputs to an electronic device.

FIG. 6 illustrates a sensor subassembly 600 for use in an optical sensing system as described herein, including a substrate 601 (e.g., a circuit board), a laser module 608 (e.g., a VCSEL module), a mounting structure 610, and a beam-directing structure 602. The substrate 601 may be an embodiment of (or a portion of) the substrate 424 in FIG. 4. The laser module 608 and the beam-directing structure 602 may also be or may be embodiments of the laser module 426 and the beam-directing structure 428 of FIG. 4.

The laser module 608 may be structurally and conductively coupled to the substrate 601, which may be a circuit board. The mounting structure 610 may be a transparent polymer structure that is positioned over and/or at least partially encapsulates the laser module 608. Further, the mounting structure 610 may cover and/or at least partially encapsulate other components that may be positioned on the substrate 601, such as processors and/or other circuitry. The mounting structure 610 may define support members 612 that are used to attach the sensor subassembly 600 to a collar (e.g., the collar 408) or other structural component of a device or optical sensing system.

The beam-directing structure 602 may be attached to the mounting structure 610, such as via optically clear adhesive, lens cement, or the like. The laser beam emitted by the laser module 608 may travel along a path that extends through the mounting structure 610 and the beam-directing structure 602. In some cases, the mounting structure 610 may be omitted or may be configured so that the laser beam only travels through the beam-directing structure 602. In some cases, no additional beam-directing structure is provided outside of the laser module 608, and the path of the laser beam extends through free space from the laser module 608 onto a sensing surface.

The beam-directing structure 602 may define optical features that are configured to aim the laser beam that is emitted from the laser module 608. The optical features may include, for example, a reflecting surface 604 that is configured to redirect the laser beam. In some cases, as illustrated in the example of FIG. 6, the reflecting surface 604 redirects the laser beam from a path segment that is parallel to the rotational axis of a crown assembly (or otherwise would not be incident on the sensing surface of a crown assembly), to a path segment that is directed towards the sensing surface of the crown assembly (e.g., at an angle that is oblique to the sensing surface at the point of incidence). In some cases, an output surface 606 changes the direction of the laser beam, while in other cases the output surface 606 does not change the direction of the laser beam (e.g., if the laser beam is normal to the output surface 606).

The beam-directing structure 602 may be formed from any suitable material, such as glass, a crystal or crystalline material, a polymer material, or the like. In some cases, the beam-directing structure 602 is a single monolithic structure, while in other cases it its formed from multiple optical elements.

As noted above, an optical sensing system may include multiple lasers or otherwise direct multiple laser beams onto sensing surface(s) of a crown assembly. In such cases, multiple laser modules may be positioned below the beam-directing structure 602 or otherwise configured to emit laser beams into the beam-directing structure 602. In such cases, the beam-directing structure 602 may define or include optical features (e.g., facets, reflecting surfaces, etc.) that guide each light beam along different paths and thereby direct the light beams onto different points of incidence on the sensing surface.

In some implementations that use multiple laser modules, multiple beam-directing structures may be used. For example, an optical sensing system may include two or more sensor subassemblies 600, each configured to direct a laser beam onto a different portion of the sensing surface.

Figure 7A:
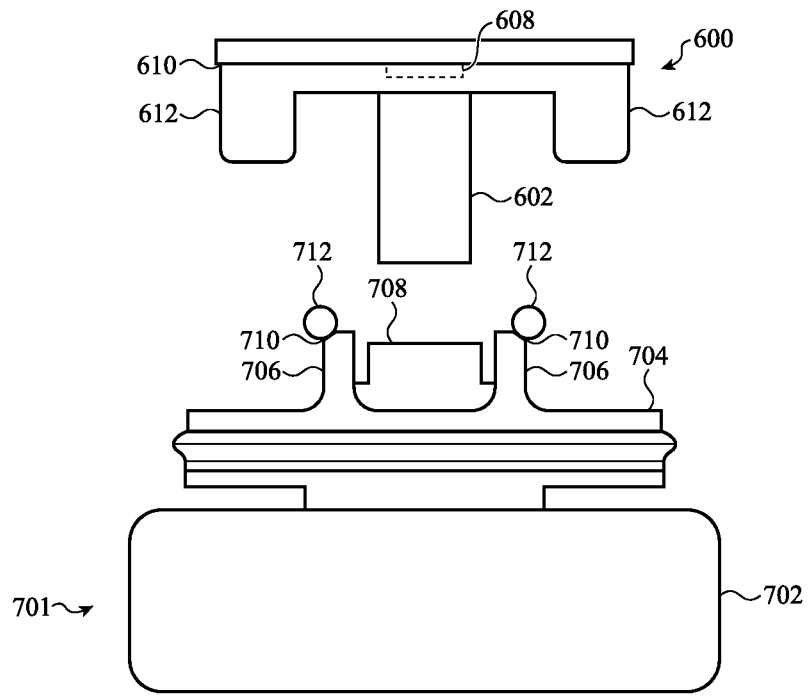
FIGS. 7A-7B depict an assembly process for assembling components of an optical sensing system.
Figure 7B:
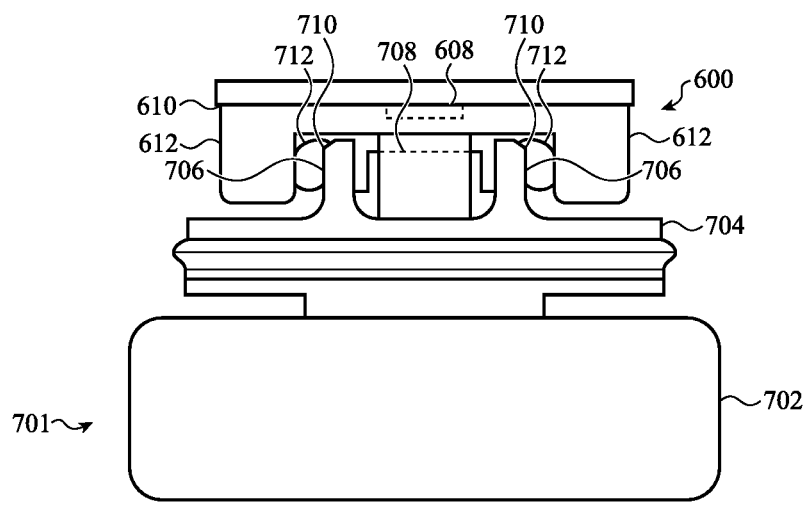

FIGS. 7A-7B illustrate an example process for assembling the sensor subassembly 600 with a collar 704 in order to accurately align the laser with the sensing surface and secure the sensor subassembly 600 to the collar while maintaining the alignment of the laser. The collar 704, which may correspond to or be an embodiment of the collar 408 in FIG. 4, may have a crown assembly 701 installed therein. For example, the crown assembly 701, which may include a knob 702 and a shaft assembly with a rotor 708 (or any other component defining a sensing surface), may be positioned in a hole in the collar 704 and secured to the collar 704 (while being allowed to rotate and/or translate relative to the collar 704 by sliding along bushings, as described above). The crown assembly 701, knob 702, and rotor 708 may correspond to or be embodiments of the corresponding components shown and described in FIG. 4.

Once the crown assembly 701 is attached to the collar 704, the relative position of the crown assembly 701, and more particularly the sensing surface of the crown assembly 701 (the rotor 708 in the example of FIG. 7A), with respect to the collar 704 is established (subject to the rotations and translations of the crown assembly 701 that occur as a result of rotational and translational inputs to the crown assembly). After the crown assembly 701 is attached to the collar 704, an adhesive 712 (e.g., a flowable adhesive) may be positioned on surfaces 710 of sensor subassembly supports 706. In some cases, the surfaces 710 are chamfered surfaces that are configured to direct or encourage the adhesive 712 to flow in a particular direction and/or to a particular position during assembly, as described herein.

The sensor subassembly 600 may then be placed into position relative to the collar 704, as shown in FIG. 7B. During positioning, the support members 612 may contact the adhesive 712 and optionally cause the adhesive to flow or move against the surfaces of the support members 612 and/or the sensor subassembly supports 706. This process may increase the surface area of the support members 612 and/or the sensor subassembly supports 706 that the adhesive contacts.

In some cases, the laser module 608 may be configured to emit a laser beam during the positioning operation, such that the positioning of the sensor subassembly 600 can be finely tuned while the adhesive 712 is still compliant enough to allow the sensor subassembly 600 to move relative to the collar 704. For example, during the positioning operation, the position of the sensor subassembly 600 may be adjusted until the laser beam is directed onto the sensing surface at a target angle. In such case, the angle of the laser beam may be determined by detecting (e.g., with an optical system) the angle of incidence of the laser beam on the sensing surface, and moving the sensor subassembly 600 until the angle of incidence is within a specified tolerance of the target angle of incidence. In other examples, the relative amount of the laser beam that is reflected along the same path as the emitted laser beam may be monitored, and the sensor subassembly 600 may be moved until the target amount of the laser beam is reflected along the emission path is reached.

Once the sensor subassembly 600 is positioned correctly relative to the collar 704 and/or the sensing surface, the adhesive 712 is allowed to harden to retain the sensor subassembly 600 to the collar 704 and in position relative to the collar 704 and/or the sensing surface. In some cases, the sensor subassembly 600 may be retained in position (e.g., by the fixture or machine that was used to position the sensor subassembly 600) during at least part of the hardening process to prevent or inhibit the sensor subassembly 600 from moving out of position until the adhesive is sufficiently hardened to maintain the positioning.

In some cases, the adhesive 712 is an ultraviolet-curable adhesive, and ultraviolet light is directed onto the adhesive 712 while the fixture maintains the sensor subassembly 600 in position to at least partially harden or cure the adhesive 712. The mounting structure 610 may be formed of a transparent or translucent material (at least to ultraviolet light), such that ultraviolet light can penetrate through the mounting structure 610 to reach and cure the adhesive 712. Once the adhesive 712 is at least partially hardened or cured, the fixture holding the sensor subassembly 600 in position may release the sensor subassembly 600. If the adhesive 712 is only partially cured, it may then be subjected to a final hardening operation in which the adhesive is allowed to fully harden or cure (e.g., heating, UV light exposure, allowing time for the adhesive 712 to harden without further intervention, etc.).

Figure 8:
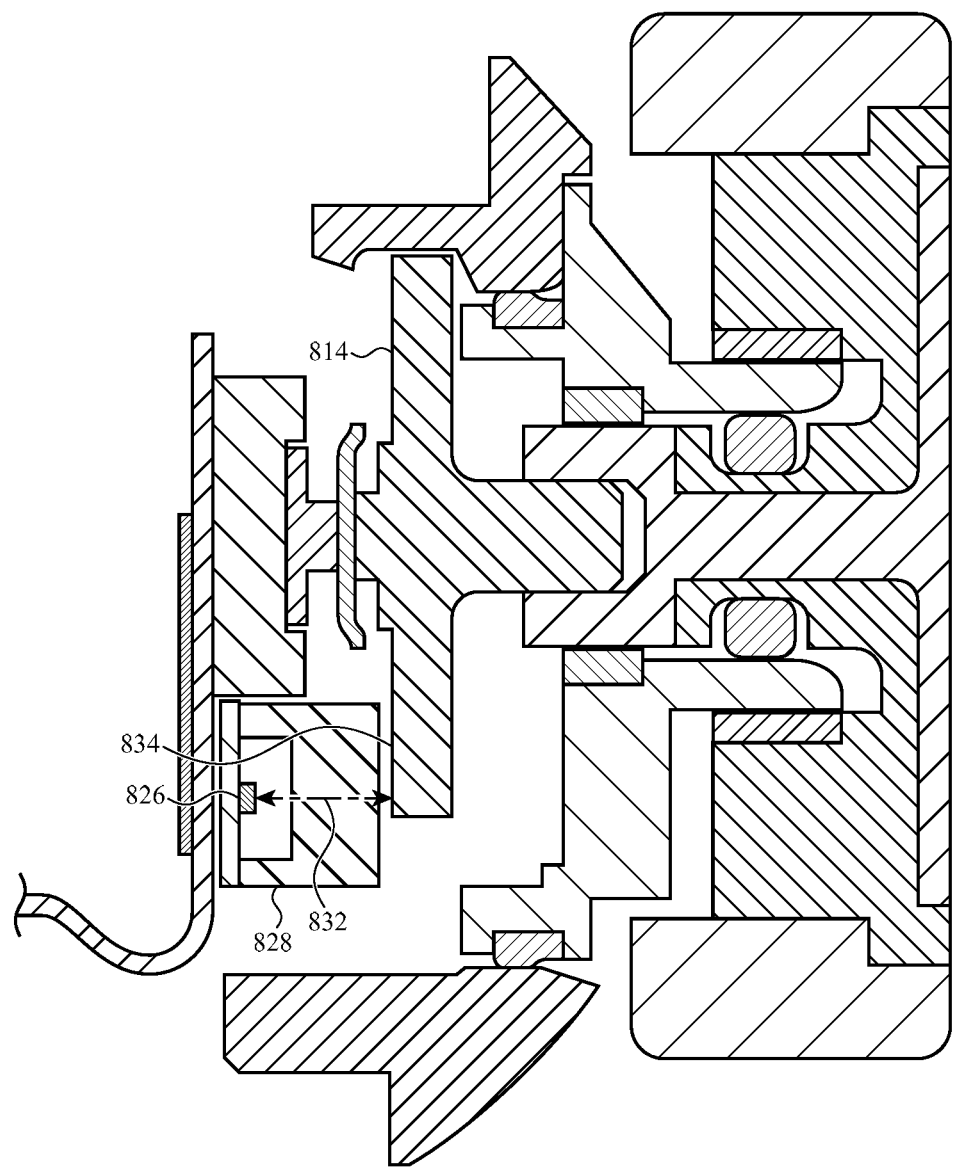
FIG. 8 depicts a partial cross-sectional view of another example input system for an electronic device.

As noted above, rotational sensing using the laser-based sensing systems and techniques described herein may operate by directing a laser beam onto the surface of a shaft assembly. As shown in FIG. 4, for example, the laser beam may be directed onto a peripheral surface of a rotor or other surface of a shaft assembly (e.g., a cylindrical surface). In some cases, sensing rotation using the laser-based techniques described herein may be achieved by directing the laser beam onto a different rotating surface, such as the surface of a rotating disk or disk-like surface (which may be a planar surface). FIG. 8 illustrates an example implementation of an input system using the laser-based sensing techniques, in which the shaft assembly includes a disk member that defines the sensing surface. The following description focuses on the differences between the implementations shown in FIGS. 4 and 8, though it will be recognized that many of the components in FIG. 8 are the same as corresponding components in FIG. 4, and for brevity those details are not repeated here. It will be understood that the same descriptions from FIG. 4 apply equally and/or by analogy to the corresponding components in FIG. 8.

As shown in FIG. 8, a crown assembly may include a disk member 814. The disk member 814 may be part of a shaft assembly of a crown assembly, similar to the rotor 416 described above. In some cases, the disk member 814 is coupled to a shaft portion of a cap assembly (as shown). In some cases, a disk member or disk-like sensing surface is defined by a unitary cap assembly (e.g., the disk is part of the same monolithic piece of material as the rest of the cap assembly). A disk member or disk surface may be integrated with a crown in other ways as well.

The disk member 814 (or any other suitable structure) defines a sensing surface 834, and a laser beam from a laser module 826 (e.g., a VCSEL) is aimed or otherwise directed onto the sensing surface 834 along a path 832. In some cases, a beam-directing structure 828 is configured to aim the laser beam along the path 832 and may change the direction of the laser beam emitted by the laser module 826. The beam-directing structure 828 may be formed from any suitable material(s), such as glass, a crystal or crystalline material, a polymer material, or the like, and may be a monolithic (e.g., single piece) optical element, or it may be formed from or include multiple optical elements.

Figure 9:
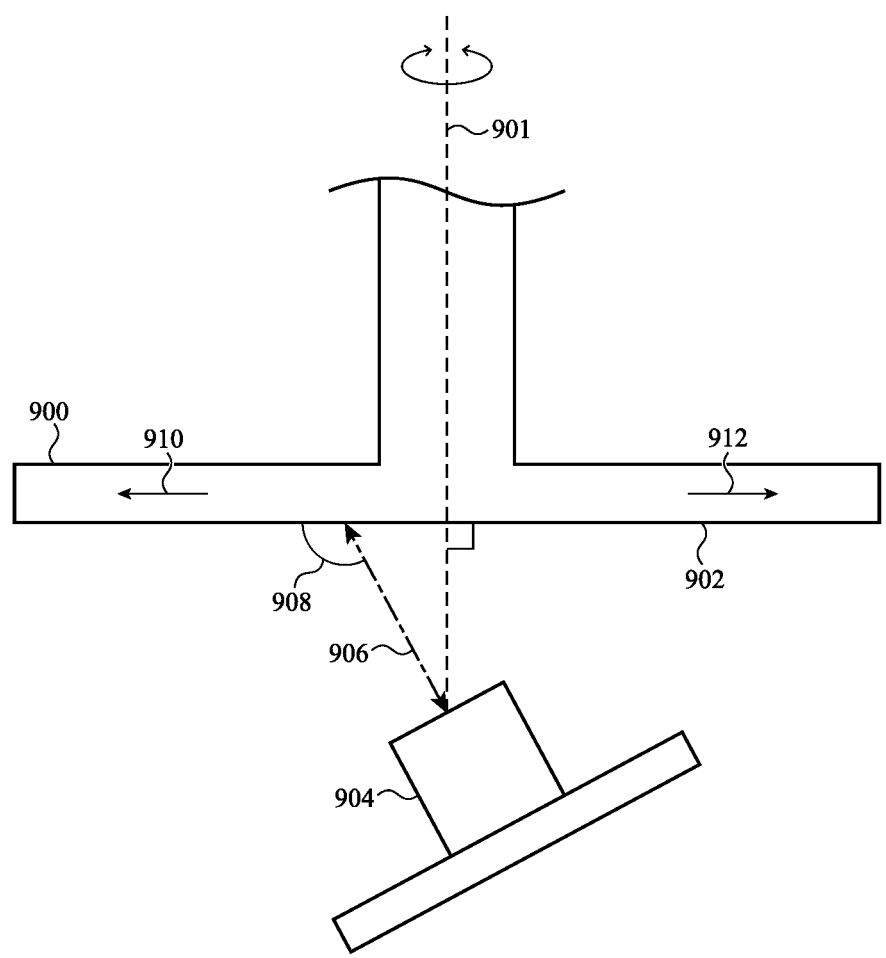
FIG. 9 depicts a schematic illustration of an example rotational sensing system.

As described in greater detail with respect to FIG. 9, the laser beam is incident on the sensing surface 834 at an angle that is not perpendicular to the sensing surface 834 at the point of incidence. Further, the sensing surface 834 is configured to reflect at least a portion of the incident laser beam back along the path 832 to the laser module 826. Accordingly, when the sensing surface 834 is rotating due to rotation of the crown, the motion of the sensing surface 834 causes the portion of the laser beam that is reflected back along the same path as the incident beam (referred to as the reflected portion) to have a different frequency than the incident beam. The different frequency may have an effect on the laser module 826 that can be used to determine rotational characteristics of the rotation of the crown. For example, the reflected light may cause a change in a frequency, amplitude, and/or other property(s) of the light being produced by the laser module 826 or may otherwise produce an effect in the resonator of the laser emitter. These changes and/or effects may be detected by the laser (and/or associated components and circuitry) and used to generate a signal that corresponds to a rotational motion of the crown. The signal may then be used to control functions of the device, such as to modify graphical outputs being displayed on the device.

FIG. 9 depicts an example configuration for detecting characteristics of rotation of a planar surface of a crown assembly, such as a surface of a disk member. A disk member 900 (which may correspond to or be an embodiment of the disk member 814, FIG. 8) defines a sensing surface 902, which may be planar. The disk member 900 is configured to rotate about a rotation axis 901 (which may also be the rotation axis of a crown). Rotation of the disk member 900 in a first direction is indicated by the arrow 910, while rotation of the disk member 900 in a second direction is indicated by the arrow 912.

A laser beam is emitted along a path 906 from the module 904 (which may correspond to or be an embodiment of the laser module 826, FIG. 8) is incident on the sensing surface 902 at an angle 908, which is oblique (e.g., not perpendicular to nor parallel) to the sensing surface 902. The oblique angle of incidence of the laser beam is configured so that the portion of the laser beam that is reflected back along the path 906 has a frequency that differs from that of the emitted laser beam. For example, in the configuration shown in FIG. 9, if the disk member 900 is rotating such that the sensing surface 902 is moving in the direction indicated by arrow 910, the reflected portion of the laser beam will have a lower frequency than the emitted laser beam. If the disk member 900 is rotating such that the sensing surface 902 is moving in the direction indicated by arrow 912, on the other hand, the reflected portion of the laser beam will have a higher frequency than the emitted laser beam. Further, as noted above, the magnitude of the difference between the emitted and reflected laser beams corresponds to the speed of rotation. Accordingly, the difference in frequency between the reflected and emitted laser beams may be used to determine characteristics of rotation of the crown.

The particular angle of incidence of the emitted laser beam may be selected so that a target proportion of the emitted laser beam is reflected along the same path. The angle 908 may be between about 100 degrees and about 170 degrees, or any other suitable angle. Additionally, the sensing surface may have a surface texture that facilitates reflection of the laser beam back along the path into the emitter. For example, the sensing surface may have a surface roughness (Ra) value of between about 0.025-10 microns. In some cases, the sensing surface may be characterized by a bidirectional reflectance distribution function (or other metric) in which a target amount or ratio of the reflected light is reflected back along the incident path.

FIG. 9 illustrates the entire laser module 904 angled with respect to the sensing surface 902, though this is merely one technique for directing the laser beam onto the sensing surface at the target angle. In other cases, the laser module 904 may be oriented such that the laser beam is initially aimed perpendicularly to the sensing surface 902, and a beam-directing structure (e.g., the beam-directing structure 828) is configured to change the direction of the emitted laser beam so that the incident portion of the laser beam is incident on the sensing surface 902 at an oblique angle. It will be understood that it is possible to achieve the desired angle of incidence with various different orientations and/or positionings of the laser module 904 and one or more beam-directing structures.

Figure 10:
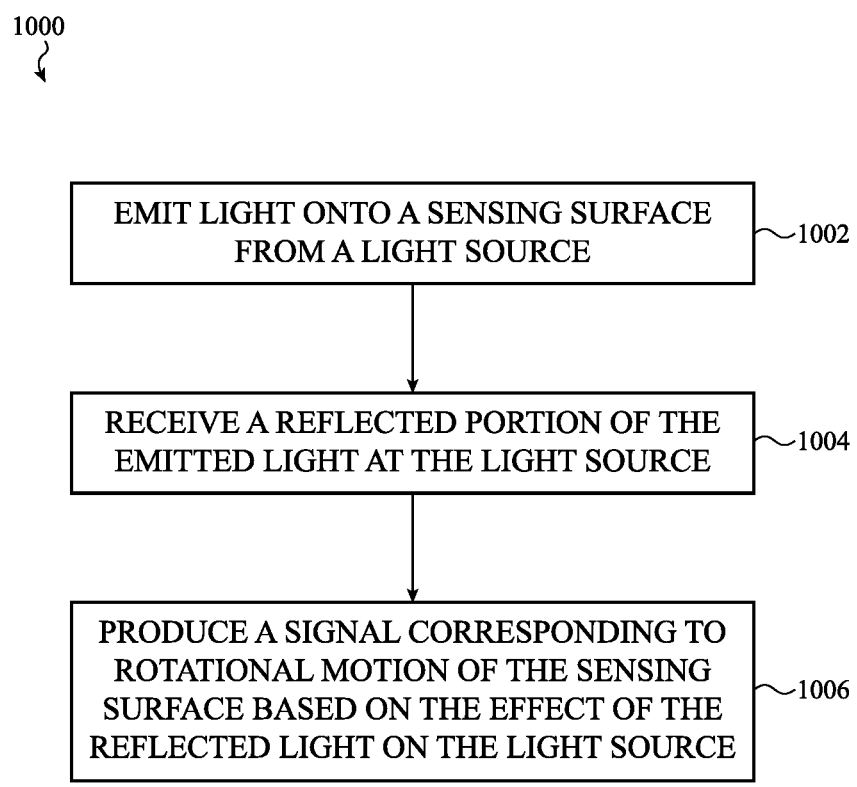
FIG. 10 depicts an example process for detecting a rotation using an optical sensing system.

FIG. 10 is a flow chart of an example process 1000 for detecting characteristics of rotational inputs of a crown of an electronic device. The process 1000 may be performed by an electronic device, such as a wearable electronic device (e.g., watch, headphones, etc.), phone, tablet computer, notebook computer, peripheral input device, or the like (and/or an input sensor associated with such devices). The process 1000 may be performed using optical sensing systems as described herein, such as those described with respect to FIGS. 2A-9.

At operation 1002, light is emitted onto a sensing surface from a light source. As described herein, the light may be a laser beam emitted from a laser module, and the sensing surface may be a surface of a crown assembly that is configured to rotate in conjunction with (and/or in response to) a rotational input to a crown assembly. The light may be incident on the sensing surface at an angle that is oblique to the sensing surface at the point of incidence, as described with respect to FIGS. 2A-3 and 9.

At operation 1004, reflected light is received at the light source from the sensing surface. The reflected light is received along the same path of the emitted light, and is a portion of the light that was emitted onto the sensing surface. As described herein, the amount of the emitted light that is reflected back into the light source (e.g., a laser module) may be defined at least in part by the selected angle of incidence of the laser beam and one or more properties of the sensing surface (e.g., bidirectional reflectance distribution function, Ra value, etc.).

At operation 1006, a signal corresponding to the rotational motion of the sensing surface is produced based on the effect of the reflected light on the light source. The signal may be produced by an optical sensing system alone and/or in conjunction with other components or systems of the device in which it is integrated. The signal may indicate a speed and/or a direction of the rotational motion of the sensing surface. As described herein, the signal may be produced by detecting a change in a frequency, amplitude, and/or other property(ies) of the light being produced by a laser module, where the change is due to the effect of the reflected light on the operation of the laser module. For example, the change may be due to the difference in frequency between the emitted and reflected light, where the difference in frequency is produced as a result of the motion of the sensing surface when the light is reflected. This phenomenon may be referred to as or resemble a Doppler effect or Doppler shift. The resulting signal may be used to control functions of the device, such as to modify graphical outputs being displayed on the device. For example, a graphical output may be scrolled, zoomed, moved, or the like, based on the speed and/or direction of rotation of the crown.

Figure 11:
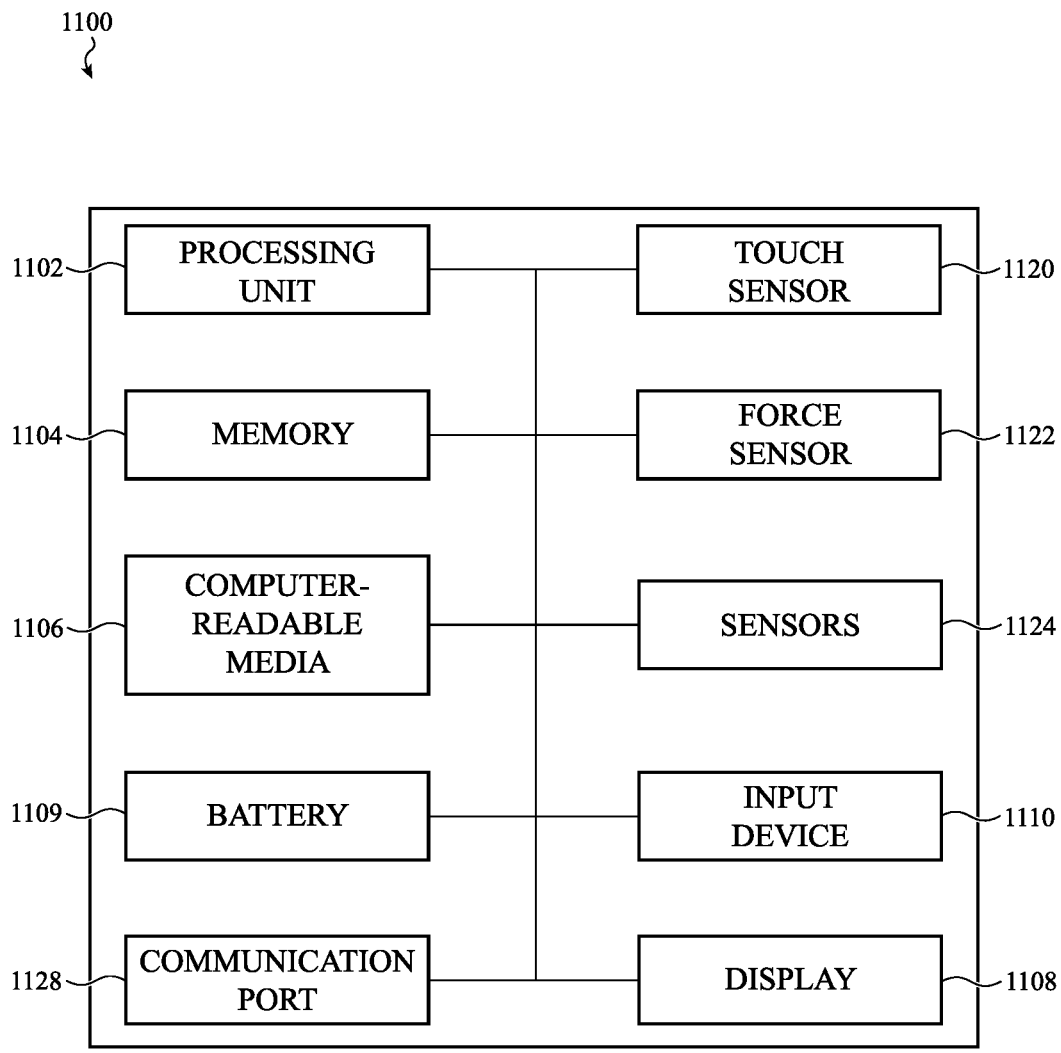
FIG. 11 depicts example components of a wearable electronic device.

FIG. 11 depicts an example schematic diagram of an electronic device 1100. By way of example, the device 1100 of FIG. 11 may correspond to the wearable electronic device 100 shown in FIGS. 1A-1B (or any other wearable electronic device described herein). To the extent that multiple functionalities, operations, and structures are disclosed as being part of, incorporated into, or performed by the device 1100, it should be understood that various embodiments may omit any or all such described functionalities, operations, and structures. Thus, different embodiments of the device 1100 may have some, none, or all of the various capabilities, apparatuses, physical features, modes, and operating parameters discussed herein.

As shown in FIG. 11, a device 1100 includes a processing unit 1102 operatively connected to computer memory 1104 and/or computer-readable media 1106. The processing unit 1102 may be operatively connected to the memory 1104 and computer-readable media 1106 components via an electronic bus or bridge. The processing unit 1102 may include one or more computer processors or microcontrollers that are configured to perform operations in response to computer-readable instructions. The processing unit 1102 may include the central processing unit (CPU) of the device. Additionally or alternatively, the processing unit 1102 may include other processors within the device including application specific integrated chips (ASIC) and other microcontroller devices.

The memory 1104 may include a variety of types of non-transitory computer-readable storage media, including, for example, read access memory (RAM), read-only memory (ROM), erasable programmable memory (e.g., EPROM and EEPROM), or flash memory. The memory 1104 is configured to store computer-readable instructions, sensor values, and other persistent software elements. Computer-readable media 1106 also includes a variety of types of non-transitory computer-readable storage media including, for example, a hard-drive storage device, a solid-state storage device, a portable magnetic storage device, or other similar device. The computer-readable media 1106 may also be configured to store computer-readable instructions, sensor values, and other persistent software elements.

In this example, the processing unit 1102 is operable to read computer-readable instructions stored on the memory 1104 and/or computer-readable media 1106. The computer-readable instructions may adapt the processing unit 1102 to perform the operations or functions described above with respect to FIGS. 1A-10. In particular, the processing unit 1102, the memory 1104, and/or the computer-readable media 1106 may be configured to cooperate with a sensor 1124 (e.g., a rotation sensor that senses rotation of a crown component or a sensor that senses motion of a user's finger) to control the operation of a device in response to an input applied to a crown of a device (e.g., the crown assembly 112). The computer-readable instructions may be provided as a computer-program product, software application, or the like.

As shown in FIG. 11, the device 1100 also includes a display 1108. The display 1108 may include a liquid-crystal display (LCD), organic light emitting diode (OLED) display, light emitting diode (LED) display, or the like. If the display 1108 is an LCD, the display 1108 may also include a backlight component that can be controlled to provide variable levels of display brightness. If the display 1108 is an OLED or LED type display, the brightness of the display 1108 may be controlled by modifying the electrical signals that are provided to display elements. The display 1108 may correspond to any of the displays shown or described herein.

The device 1100 may also include a battery 1109 that is configured to provide electrical power to the components of the device 1100. The battery 1109 may include one or more power storage cells that are linked together to provide an internal supply of electrical power. The battery 1109 may be operatively coupled to power management circuitry that is configured to provide appropriate voltage and power levels for individual components or groups of components within the device 1100. The battery 1109, via power management circuitry, may be configured to receive power from an external source, such as an AC power outlet. The battery 1109 may store received power so that the device 1100 may operate without connection to an external power source for an extended period of time, which may range from several hours to several days.

In some embodiments, the device 1100 includes one or more input devices 1110. An input device 1110 is a device that is configured to receive user input. The one or more input devices 1110 may include, for example, a crown input system, a push button, a touch-activated button, a keyboard, a keypad, or the like (including any combination of these or other components). In some embodiments, the input device 1110 may provide a dedicated or primary function, including, for example, a power button, volume buttons, home buttons, scroll wheels, and camera buttons.

The device 1100 may also include a sensor 1124. The sensor 1124 may detect inputs provided by a user to a crown of the device (e.g., the crown assembly 112). The sensor 1124 may include sensing circuitry and other sensing components that facilitate sensing of rotational motion of a crown, as well as sensing circuitry and other sensing components (optionally including a switch) that facilitate sensing of axial motion of the crown. The sensor 1124 may include components such as a laser module (e.g., the laser modules 426, 826), a sensing surface (e.g., the sensing surfaces 434, 834), a tactile or dome switch, or any other suitable components or sensors that may be used to provide the sensing functions described herein. The sensor 1124 may also be a biometric sensor, such as a heart rate sensor, electrocardiograph sensor, temperature sensor, or any other sensor that conductively couples to the user and/or to the external environment through a crown input system, as described herein. In cases where the sensor 1124 is a biometric sensor, it may include biometric sensing circuitry, as well as portions of a crown that conductively couple a user's body to the biometric sensing circuitry. Biometric sensing circuitry may include components such as processors, capacitors, inductors, transistors, analog-to-digital converters, or the like.

The device 1100 may also include a touch sensor 1120 that is configured to determine a location of a touch on a touch-sensitive surface of the device 1100 (e.g., an input surface defined by the portion of a cover 108 over a display 109). The touch sensor 1120 may use or include capacitive sensors, resistive sensors, surface acoustic wave sensors, piezoelectric sensors, strain gauges, or the like. In some cases, the touch sensor 1120 associated with a touch-sensitive surface of the device 1100 may include a capacitive array of electrodes or nodes that operate in accordance with a mutual-capacitance or self-capacitance scheme. The touch sensor 1120 may be integrated with one or more layers of a display stack (e.g., the display 109) to provide the touch-sensing functionality of a touchscreen. Moreover, the touch sensor 1120, or a portion thereof, may be used to sense motion of a user's finger as it slides along a surface of a crown, as described herein.

The device 1100 may also include a force sensor 1122 that is configured to receive and/or detect force inputs applied to a user input surface of the device 1100 (e.g., the display 109). The force sensor 1122 may use or include capacitive sensors, resistive sensors, surface acoustic wave sensors, piezoelectric sensors, strain gauges, or the like. In some cases, the force sensor 1122 may include or be coupled to capacitive sensing elements that facilitate the detection of changes in relative positions of the components of the force sensor (e.g., deflections caused by a force input). The force sensor 1122 may be integrated with one or more layers of a display stack (e.g., the display 109) to provide force-sensing functionality of a touchscreen.

The device 1100 may also include a communication port 1128 that is configured to transmit and/or receive signals or electrical communication from an external or separate device. The communication port 1128 may be configured to couple to an external device via a cable, adaptor, or other type of electrical connector. In some embodiments, the communication port 1128 may be used to couple the device 1100 to an accessory, including a dock or case, a stylus or other input device, smart cover, smart stand, keyboard, or other device configured to send and/or receive electrical signals.

As described above, one aspect of the present technology is the gathering and use of data from a user. The present disclosure contemplates that in some instances this gathered data may include personal information data that uniquely identifies or can be used to contact or locate a specific person. Such personal information data can include demographic data, location-based data, telephone numbers, email addresses, twitter IDs (or other social media aliases or handles), home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to provide haptic or audiovisual outputs that are tailored to the user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act ("HIPAA"); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of determining spatial parameters, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, haptic outputs may be provided based on non-personal information data or a bare minimum amount of personal information, such as events or states at the device associated with a user, other non-personal information, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings. Also, when used herein to refer to positions of components, the terms above and below, or their synonyms, do not necessarily refer to an absolute position relative to an external reference, but instead refer to the relative position of components with reference to the figures.

What is claimed is:

1. An electronic watch comprising:
a housing;
a crown assembly comprising:
a rotatable actuation member comprising:
a knob external to the housing and configured to receive a rotational input; and
a shaft assembly coupled to the knob and positioned at least partially within the housing, the shaft assembly defining a sensing surface configured to rotate in response to the rotational input; and
an optical sensing system configured to detect the rotational input using operations including,
directing light onto the sensing surface;
receiving reflected light from the sensing surface; and
producing a signal corresponding to a rotational motion of the sensing surface, the signal based at least in part on an interference between the light directed onto the sensing surface and the reflected light.

2. The electronic watch of claim 1, wherein:
the electronic watch is configured to determine a speed and a direction of the rotational motion of the sensing surface based on the signal;
the electronic watch further comprises:
a display positioned at least partially within the housing and configured to display a graphical output;
a transparent cover coupled to the housing; and
a touch sensor positioned below the transparent cover and configured to detect touch inputs applied to the transparent cover; and
the electronic watch is configured to modify the graphical output in accordance with the speed and the direction of the rotational motion of the sensing surface.

3. The electronic watch of claim 1, wherein a beam axis of the light directed onto the sensing surface is oblique to the sensing surface.

4. The electronic watch of claim 1, wherein:
the light directed onto the sensing surface includes a laser beam;
the reflected light is a reflected portion of the laser beam; and
the optical sensing system comprises a laser module configured to emit the laser beam and receive the reflected portion of the laser beam.

5. The electronic watch of claim 4, wherein:
the laser module is a vertical cavity surface emitting laser;
the vertical cavity surface emitting laser detects a difference in frequency between the emitted laser beam and the reflected portion of the laser beam; and
the signal is based at least in part on the difference in the frequency.

6. The electronic watch of claim 4, wherein:
the laser beam is a first laser beam;
the laser module is a first laser module; and
the optical sensing system further comprises a second laser module configured to:
emit a second laser beam, the second laser beam being directed onto the sensing surface; and
receive a reflected portion of the second laser beam.

7. The electronic watch of claim 1, wherein:
the shaft assembly comprises a disk member; and
the sensing surface is a planar surface of the disk member.

8. An electronic watch comprising:
a housing;
a crown assembly configured to receive a rotational input and defining a sensing surface at least partially within the housing and configured to rotate in response to the rotational input; and
an optical sensing system comprising a laser module configured to:
emit a beam of coherent light; and
receive a reflected portion of the beam, the reflected portion of the beam reflected from the sensing surface of the crown assembly;
wherein the optical sensing system is configured to produce a signal corresponding to a rotational motion of the sensing surface of the crown assembly, the signal based at least in part on a difference in frequency between the emitted beam and the reflected portion of the beam.

9. The electronic watch of claim 8, wherein:
a rotational motion in a first direction corresponds to the reflected portion of the beam having a lower frequency than the emitted beam; and
a rotational motion in a second direction opposite the first direction corresponds to the reflected portion of the beam having a higher frequency than the emitted beam.

10. The electronic watch of claim 8, wherein:
a rotational motion in a first direction and having a first rotational speed corresponds to the reflected portion of the beam having a first frequency; and
a rotational motion in the first direction and having a second rotational speed corresponds to the reflected portion of the beam having a second frequency that is different from the first frequency.

11. The electronic watch of claim 10, wherein:
the first rotational speed is higher than the second rotational speed; and
the first frequency is higher than the second frequency.

12. The electronic watch of claim 11, wherein:
the emitted beam has a third frequency; and
the first frequency and the second frequency are different than the third frequency.

13. The electronic watch of claim 8, wherein:
the emitted beam is directed onto the sensing surface in a first direction along a path;
the reflected portion of the beam is reflected from the sensing surface in a second direction along the path, the second direction opposite to the first direction; and
an incident portion of the beam is not perpendicular to the sensing surface of the crown assembly.

14. The electronic watch of claim 13, wherein:
the laser module is a vertical cavity surface emitting laser;
the reflected portion of the beam changes at least one of a frequency or an amplitude of light produced by the vertical cavity surface emitting laser; and
the change of the at least one of the frequency or the amplitude of the light produced by the vertical cavity surface emitting laser corresponds to the difference in frequency between the emitted beam and the reflected portion of the beam.

15. The electronic watch of claim 8, wherein the difference in frequency between the emitted beam and the reflected portion of the beam is caused by a Doppler effect.

16. An electronic device comprising:
a housing;
a crown assembly configured to receive a rotational input and defining a sensing surface at least partially within the housing and configured to rotate in response to the rotational input; and
an optical sensing system comprising a laser module configured to:
emit a laser beam, the emitted laser beam directed along a path segment in a first direction onto the sensing surface; and
receive a reflected portion of the laser beam, the reflected portion reflected from the sensing surface and travelling along the path segment in a second direction opposite to the first direction;
wherein the optical sensing system is configured to produce a signal corresponding to a rotational motion of the sensing surface of the crown assembly, the signal based at least in part on an interaction between the emitted laser beam and the reflected portion of the laser beam.

17. The electronic device of claim 16, wherein the path segment does not intersect a rotational axis of the crown assembly.

18. The electronic device of claim 16, wherein the optical sensing system further comprises a beam-directing structure configured to aim the laser beam along the path segment.

19. The electronic device of claim 18, wherein the beam-directing structure defines a reflecting surface configured to aim the laser beam along the path segment.

20. The electronic device of claim 18, wherein:
the electronic device further comprises a collar attached to the housing and configured to retain the crown assembly to the housing;
the beam-directing structure is coupled to a mounting structure; and
the mounting structure is adhered to the collar, thereby fixing an orientation of the beam-directing structure relative to the crown assembly.

* * * * *